(12) United States Patent
Kimura et al.

(10) Patent No.: US 12,411,002 B2
(45) Date of Patent: Sep. 9, 2025

(54) OPTICAL INTERFERENCE RANGE SENSOR

(71) Applicant: OMRON Corporation, Kyoto (JP)

(72) Inventors: Kazuya Kimura, Kyoto (JP);
Masayuki Hayakawa, Kyoto (JP);
Yusuke Nagasaki, Kyoto (JP)

(73) Assignee: OMRON Corporation, Kyoto (JP)

( * ) Notice: Subject to any disclaimer, the term of this patent is extended or adjusted under 35 U.S.C. 154(b) by 279 days.

(21) Appl. No.: 17/894,202

(22) Filed: Aug. 24, 2022

(65) Prior Publication Data

US 2023/0084871 A1 Mar. 16, 2023

(30) Foreign Application Priority Data

Sep. 15, 2021 (JP) .................................. 2021-150100

(51) Int. Cl.
*G01B 9/02* (2022.01)
*G01B 9/02004* (2022.01)
(Continued)

(52) U.S. Cl.
CPC ..... *G01B 9/02084* (2013.01); *G01B 9/02004* (2013.01); *G01B 9/02015* (2013.01);
(Continued)

(58) Field of Classification Search
CPC ............ G01B 9/02004; G01B 9/02019; G01B 9/02027; G01B 9/02057; G01B 9/02084; G01B 9/0209; G01B 11/2441
See application file for complete search history.

(56) References Cited

U.S. PATENT DOCUMENTS 4,892,406 A 1/1990 Waters
5,596,409 A 1/1997 Marcus et al.
(Continued)

FOREIGN PATENT DOCUMENTS

CN 1064932 A 9/1992
CN 107479057 A 12/2017
(Continued)

OTHER PUBLICATIONS

Japanese Office Action mailed on Apr. 21, 2025 in a counterpart Japanese patent application No. 2021-150100.
(Continued)

*Primary Examiner* — Michael A Lyons
(74) *Attorney, Agent, or Firm* — METROLEX IP LAW GROUP, PLLC; Robert L. Scott, Esq.

(57) ABSTRACT

A light source projects a light beam. An interferometer includes a splitting unit that splits the light beam. The interferometer generates interference beams with the respective split light beams. Each of the interference beam is generated by interference between a measurement beam radiated toward the measurement target and reflected at the measurement beam and a reference beam passing through an optical path. A light-receiving unit receives the interference beams. A processor calculates a distance to the measurement target by associating at least one detected peak with at least one of the spots in accordance with a mirror surface mode or a rough surface mode. The optical path length difference is made different among the split light beams. In the mirror surface mode, the processor uses a distance calculated based on a peak corresponding to a spot for which the optical path length difference is shortest.

20 Claims, 22 Drawing Sheets

(51) Int. Cl.
  *G01B 9/02015* (2022.01)
  *G01B 9/02017* (2022.01)
  *G01B 9/02056* (2022.01)
  *G01B 9/0209* (2022.01)
  *G01B 11/30* (2006.01)

(52) U.S. Cl.
  CPC ..... *G01B 9/02019* (2013.01); *G01B 9/02027* (2013.01); *G01B 9/02057* (2013.01); *G01B 9/0209* (2013.01); *G01B 11/303* (2013.01); *G01B 2290/60* (2013.01)

(56) References Cited

U.S. PATENT DOCUMENTS

| | | | |
|---|---|---|---|
| 5,659,392 | A | 8/1997 | Marcus et al. |
| 5,933,237 | A | 8/1999 | Drabarek |
| 2006/0126073 | A1 | 6/2006 | Farrell et al. |
| 2007/0171425 | A1† | 7/2007 | De Groot |
| 2007/0278389 | A1* | 12/2007 | Ajgaonkar ........... G01B 9/0205 250/221 |
| 2008/0074636 | A1 | 3/2008 | Yabe |
| 2011/0246116 | A1 | 10/2011 | Kamitani et al. |
| 2015/0176969 | A1* | 6/2015 | Jensen ................ G01B 9/0205 356/4.09 |
| 2018/0238678 | A1† | 8/2018 | Mizutani |
| 2021/0285755 | A1 | 9/2021 | Kimura et al. |
| 2021/0286055 | A1 | 9/2021 | Kimura et al. |
| 2022/0133446 | A1* | 5/2022 | Tao .................... G01B 9/02091 433/29 |

FOREIGN PATENT DOCUMENTS

| | | |
|---|---|---|
| CN | 113390333 A | 9/2021 |
| CN | 113390444 A | 9/2021 |
| DE | 19721843 C1 | 2/1999 |
| EP | 0733877 A2 | 9/1996 |
| JP | H02245603 A * | 10/1990 |
| JP | 2686124 B2 | 12/1997 |
| JP | 2005-352575 A | 12/2005 |
| JP | 2006-038571 A | 2/2006 |
| JP | 2008-076212 A | 4/2008 |
| JP | 2009-258192 A | 11/2009 |
| JP | 2011-215005 A | 10/2011 |
| JP | 2016-001143 A | 1/2016 |
| JP | 2016-017919 A | 2/2016 |
| JP | 2020-104158 A | 7/2020 |
| JP | 2021-032734 A | 3/2021 |

OTHER PUBLICATIONS

A Chinese Office Action mailed on Jun. 26, 2025 in a counterpart Japanese patent application No. 202210946006.2.

* cited by examiner
† cited by third party

OPTICAL INTERFERENCE RANGE SENSOR

CROSS-REFERENCES TO RELATED APPLICATIONS

This application claims priority to Japanese Patent Application No. 2021-150100 filed on Sep. 15, 2021, the entire contents of which are incorporated herein by reference.

FIELD

The disclosure relates to an optical interference range sensor.

BACKGROUND

In recent years, optical range sensors that contactlessly measure the distance to a measurement target have been widely used. For example, known optical range sensors include optical interference range sensors that generate an interference beam by interference between a reference beam and a measurement beam from a light beam projected from a wavelength-swept light source and measure the distance to a measurement target based on the interference beam.

Further, known conventional optical interference range sensors also include sensors that are configured to radiate a plurality of beams toward a measurement target to measure the measurement target with high accuracy.

In an optical measurement device described in JP 268612462, stable measurement results are obtained by causing a return light beam component of a reference beam reflected at a plurality of optical fiber end faces and a reflection component of a measurement beam reflected at the surface of a measurement target to coherently interfere with each other.

JP 268612462 is an example of background art.

SUMMARY

However, the optical interference unit disclosed in JP 268612462 has a problem in that if, for example, a measurement target includes a rough surface and a mirror surface, the mirror surface may not be able to be accurately measured due to multiple reflections becoming disturbance light even if the rough surface can be appropriately measured.

One or more embodiments may provide an optical interference range sensor capable of appropriately measuring distance even if a measurement target includes a rough surface and a mirror surface.

An optical interference ranging sensor according to one or more embodiments includes: a light source configured to project a light beam while continuously varying a wavelength thereof; an interferometer including a splitting unit configured to split the light beam projected from the light source into light beams radiated toward a plurality of spots on a measurement target, the interferometer being configured to generate interference beams with the light beams split in correspondence with the plurality of spots, each of the interference beams being generated by interference between a measurement beam radiated toward the measurement target and reflected at the measurement target and a reference beam passing through an optical path that is at least partially different from an optical path of the measurement beam; a light-receiving unit configured to receive the interference beams from the interferometer; and a processor configured to detect a peak of the received interference beams, and calculate a distance to the measurement target by associating the detected peak with one of the plurality of spots in accordance with a mirror surface mode or a rough surface mode, which are modes for measuring the measurement target, wherein an optical path length difference between the measurement beam and the reference beam is made different among the light beams split in correspondence with the plurality of spots, and in the mirror surface mode, the processor uses, as the result of measuring the distance to the measurement target, a distance calculated based on a peak corresponding to a spot for which the optical path length difference is shortest, out of a plurality of the detected peaks.

According to one or more embodiments, the interferometer generates an interference beam by interference between the measurement beam that is radiated toward the measurement target and reflected at the measurement target and the reference beam passing through an optical path that is at least partially different from the optical path of the measurement beam, for each of the light beams split in correspondence with the plurality of spots. The light-receiving unit receives the interference beams from the interferometer. The processor detects peaks of the interference beams, and calculates the distance to the measurement target by associating the detected peaks with the respective spots in accordance with one of the mirror surface mode and the rough surface mode, which are modes for measuring the measurement target. Also, the optical path length difference between the measurement beam and the reference beam is made different among the light beams split in correspondence with the plurality of spots. Therefore, the peaks may be appropriately detected. Furthermore, in the mirror surface mode, the distance calculated based on the peak corresponding to the spot for which the optical path length difference is shortest, out of the detected peaks, is used as the result of measuring the distance to the measurement target. As a result, the distance to the measurement target may be appropriately measured even if the measurement target includes a rough surface and a mirror surface.

In one or more embodiments, in the rough surface mode, the processor may use a distance calculated based on the plurality of detected peaks as the result of measuring the distance.

According to one or more embodiments, in the rough surface mode, the processor calculates the distance to the measurement target based on a plurality of detected peaks, and may therefore measure the distance to the measurement target with higher accuracy.

In one or more embodiments, the interferometer may have one objective lens, and the measurement beam of each of the light beams split in correspondence with the plurality of spots by the splitting unit may be radiated toward the measurement target via the one objective lens.

According to one or more embodiments, the measurement beam of each of the light beams that are split in correspondence with the plurality of spots by the splitting unit is radiated toward the measurement target via one objective lens. Therefore, the spot diameter may be reduced, and the distance to the measurement target may be appropriately measured with high accuracy even if the measurement target is small. In addition, only one objective lens is provided, thus facilitating the adjustment of the optical axis and leading to cost reduction.

In one or more embodiments, a spot for which the optical path length difference is shortest, out of the optical path length differences corresponding to the respective spots, may be arranged on an optical axis of the one objective lens.

According to one or more embodiments, the spot having the shortest optical path length difference is arranged on the optical axis of one objective lens. Therefore, in the mirror surface mode, the peak corresponding to the spot with the shortest optical path length difference may be detected more appropriately. Further, the distance calculated based on the thus-detected peak is used as the result of measuring the distance to the measurement target. Therefore, the distance to the measurement target may be appropriately measured even if the measurement target includes a rough surface and a mirror surface.

In one or more embodiments, the interferometer may generate each of the interference beams by interference between a first reflected beam that is a reflected beam of the measurement beam radiated toward the measurement target and reflected at the measurement target and a second reflected beam that is a reflected beam of the reference beam reflected at a reference surface.

According to the present embodiment or embodiments, each interference beam is generated by interference between on the first reflected beam that is a reflected beam of the measurement beam radiated toward the measurement target and reflected at the measurement target and the second reflected beam that is a reflected beam of the reference beam reflected at the reference surface. The optical path length difference between the measurement beam and the reference beam is made different among the light beams split in correspondence with the plurality of spots. Therefore, the peaks may be appropriately detected. Further, in the mirror surface mode, the distance calculated based on the peak corresponding to the spot for which the optical path length distance is shortest, out of the detected peaks, is used as the result of measuring the distance to the measurement target. As a result, the distance to the measurement target may be appropriately detected even if the measurement target includes a rough surface and a mirror surface.

In one or more embodiments, positions of leading ends of optical fiber cables for transmitting the respective light beams split in correspondence with the plurality of spots may be shifted with respect to each other in an optical axis direction, each of the leading ends serving as the reference surface.

According to one or more embodiments, the leading end positions of the optical fiber cables arranged in the optical paths are shifted in the optical axis direction. Therefore, the optical path length differences in the optical paths may be made different, and the peaks may be detected more appropriately.

In one or more embodiments, a difference ΔL in the optical path length difference among the light beams split in correspondence with the plurality of spots may be at least larger than a distance resolution δLFWHM, which is represented by the following expression:

$$\delta LFWHM = c/n\delta f \quad \text{(Equation 1)}$$

(where c: speed of light, n: refractive index in optical path difference, δf: frequency sweep width).

According to one or more embodiments, the difference ΔL in the optical path length difference among the optical paths is made larger than the distance resolution $\delta L_{FWHM}$. It may, therefore, be possible to reduce overlapping of a plurality of peaks of the interference beams received by the light-receiving unit, and detect these peaks more appropriately.

In one or more embodiments, one of the mirror surface mode and the rough surface mode may be selectable by a user.

According to one or more embodiments, one of the mirror surface mode and the rough surface mode may be selected by the use. Thus, a mode may be appropriately selected in accordance with the material, state, or the like of the measurement target. As a result, the distance to the measurement target may be appropriately detected in accordance with the material, state, or the like of the measurement target, even if the measurement target includes a rough surface and a mirror surface.

In one or more embodiments, the processor may apply the mirror surface mode if the number of detected peaks of the received interference beams is larger than the number of the plurality of spots.

According to one or more embodiments, the mirror surface mode is used if the number of peaks detected in the received interference beams exceeds the number of spots. Therefore, an appropriate mode may be automatically selected and used even if no mode is selected by the user.

According to one or more embodiments, an optical interference range sensor may be provided that is capable of appropriately measuring distance even if a measurement target includes a rough surface and a mirror surface.

DETAILED DESCRIPTION

Figure 1:
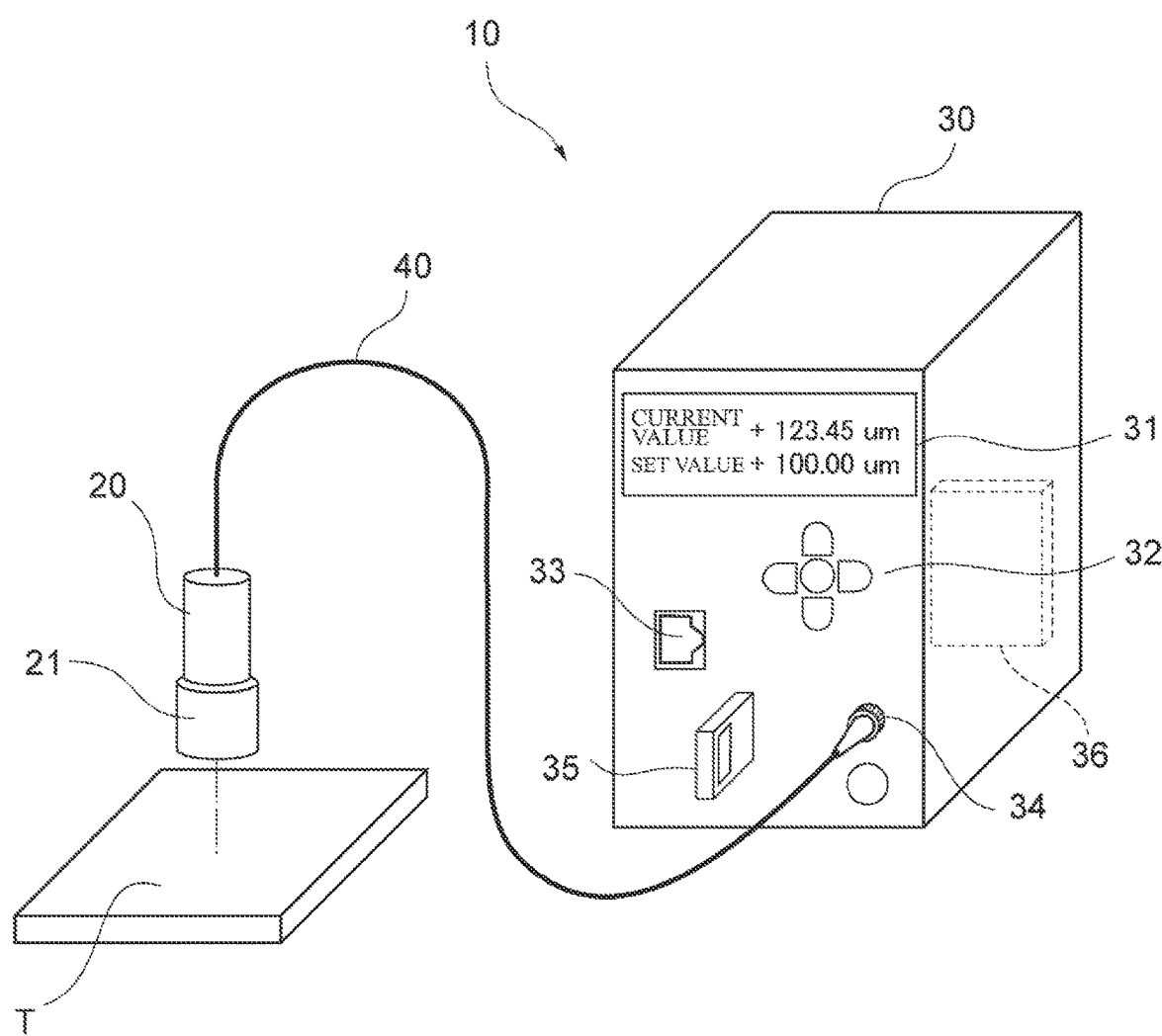
FIG. 1 is a schematic diagram illustrating an external appearance of an outline of a displacement sensor, such as a displacement sensor 10 as disclosed herein, according to one or more embodiments.

One or more embodiments will be described in detail with reference to the attached drawings. Note that the following disclosure is for giving specific examples for carrying out one or more embodiments only, and is not intended to be interpreted as being limiting or exhausting. To facilitate understanding of the description, the same constituent elements in the drawings are assigned the same signs to the extent possible, and redundant descriptions may be omitted.

Summary of Displacement Sensor

Firstly, a summary of a displacement sensor according to the present disclosure will be described. FIG. 1 is a schematic diagram of an external appearance showing an outline of a displacement sensor 10 according to the present disclosure. As shown in FIG. 1, the displacement sensor 10 includes a sensor head 20 and a controller 30, and measures displacement of a measurement target T (distance to the measurement target T).

The sensor head 20 and the controller 30 are connected by an optical fiber cable 40. An objective lens 21 is attached to the sensor head 20. The controller 30 includes a display unit 31, a setting unit 32, an external interface (I/F) unit 33, an optical fiber cable connector 34, and an external storage unit 35, and also contains a measurement processor 36.

The sensor head 20 radiates a light beam output from the controller 30 toward the measurement target T, and receives a reflected beam from the measurement target T. The sensor head 20 contains reference surfaces for reflecting a light beam that is output from the controller 30 and received via the optical fiber cable 40 and causing the reflected beam to interfere with the aforementioned reflected beam from the measurement target T.

Note that the objective lens 21 attached to the sensor head 20 is removable. The objective lens 21 can be replaced by another objective lens having an appropriate focal length in accordance with the distance between the sensor head 20 and the measurement target T. Alternatively, a variable-focus objective lens may be used.

Furthermore, when the sensor head 20 is installed, a guide beam (visible light) may be radiated toward the measurement object T, and the sensor head 20 and/or the measurement object T may be placed so that the measurement object T is appropriately positioned within a measurement area of the displacement sensor 10.

The optical fiber cable 40 is connected to the optical fiber cable connector 34 arranged on the controller 30 and connects the controller 30 to the sensor head 20. The optical fiber cable 40 thus guides a light beam projected from the controller 30 to the sensor head 20 and also guides return beams from the sensor head 20 to the controller 30. Note that the optical fiber cable 40 can be attached to and detached from the sensor head 20 and the controller 30, and may be an optical fiber with any of various lengths, thicknesses, and characteristics.

The display unit 31 in the controller 30 is a liquid crystal display, an organic EL display, or the like, for example. The display unit 31 displays set values for the displacement sensor 10, the amount of light of return beams from the sensor head 20, and measurement results such as displacement of the measurement target T (distance to the measurement target T) measured by the displacement sensor 10.

The setting unit 32 in the controller 30 allows a user to operate a mechanical button or a touch panel, for example, to configure settings necessary for measuring the measurement target T. Some or all of these necessary settings may be configured in advance, or may be configured from an externally connected device (not shown) that is connected to the external I/F unit 33. The externally connected device may be connected by wire or wirelessly via a network.

Here, the external I/F unit 33 is constituted by, for example, Ethernet (registered trademark), RS232C, analog output, or the like. The external I/F unit 33 may be connected to another connection device so that necessary settings are configured from the externally connected device, and may also output the results of measurement performed by the displacement sensor 10 to the externally connected device, for example.

Further, settings necessary for measuring the measurement target T may also be configured by the controller 30 retrieving data stored in the external storage unit 35. The external storage unit 35 is an auxiliary storage device such as a USB (Universal Serial Bus) memory. Settings or the like necessary for measuring the measurement target T are stored therein in advance.

The measurement processor 36 in the controller 30 includes, for example, a wavelength-swept light source that projects a light beam while continuously varying the wavelength, light-receiving elements that receive return beams from the sensor head 20 and convert the received beams to an electrical signal, a signal processing circuit that processes the electrical signal, and the like. The measurement processor 36 performs various processes using a controller, a storage, and the like based on return beams from the sensor head 20 so that the displacement of the measurement target T (distance to the measurement target T) is ultimately calculated. The details of the processing will be described later.

Figure 2:
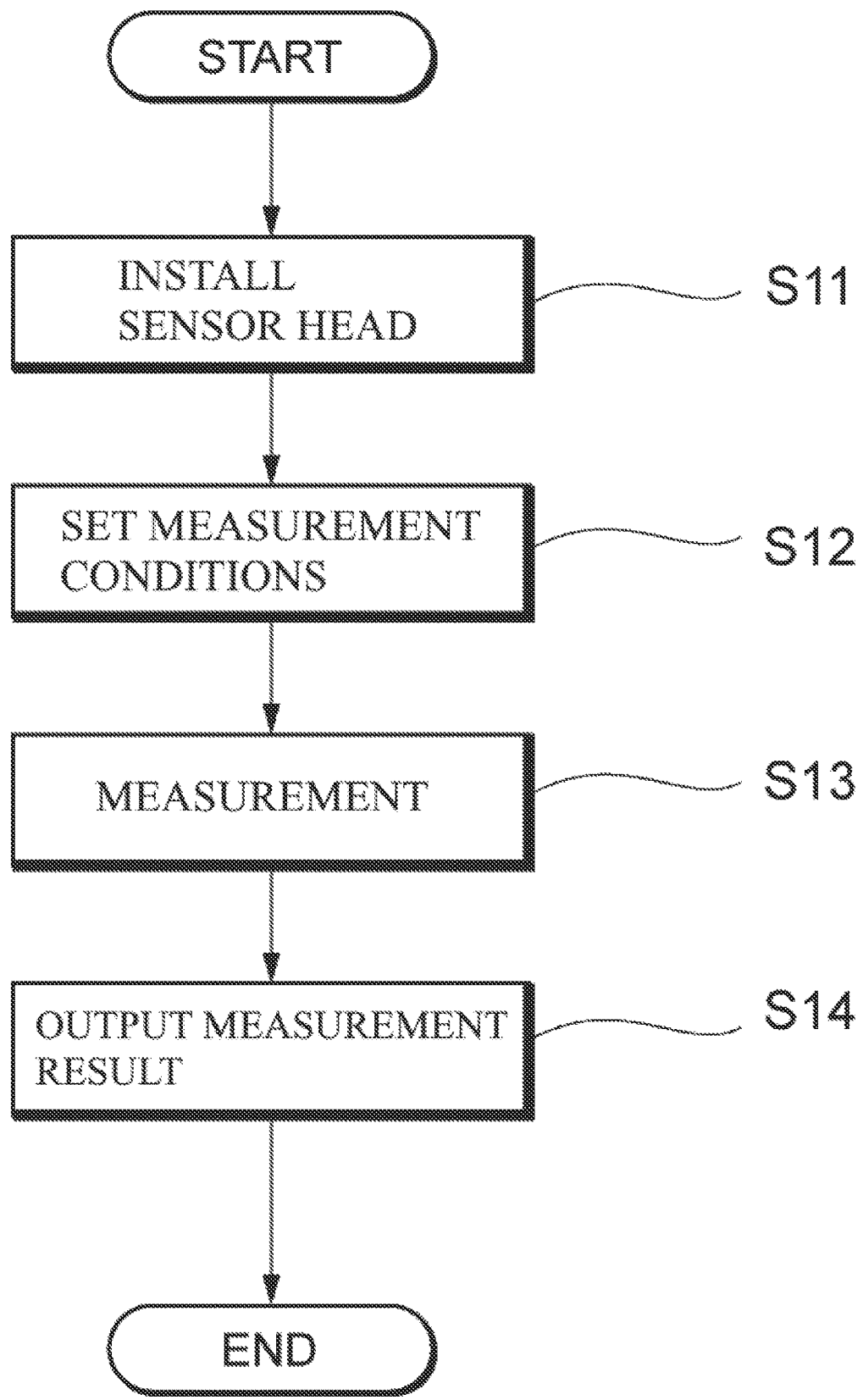
FIG. 2 is a flowchart illustrating a procedure for measuring a measurement target, such as a measurement target T as disclosed herein, with use of a displacement sensor according to one or more embodiments.

FIG. 2 is a flowchart showing a procedure for measuring a measurement target T with use of the displacement sensor 10 according to the present disclosure. The procedure includes steps S11 to S14, as shown in FIG. 2.

In step S11, the sensor head 20 is installed. For example, a guide beam is radiated from the sensor head 20 toward the measurement target T, and the sensor head 20 is installed at an appropriate position while referencing the radiated guide light.

Specifically, the amount of light of return beams received from the sensor head 20 may be displayed in the display unit 31 in the controller 30. The user may also adjust the orientation of the sensor head 20, the distance (height position) to the measurement target T, or the like while checking the amount of received light. Basically, if the light beam from the sensor head 20 is radiated more vertically (at an angle closer to vertical) relative to the measurement target T, the amount of light of reflected beams from the measurement target T becomes larger, and the amount of light of return beams received from the sensor head 20 also becomes larger.

The objective lens 21 may also be replaced with one having an appropriate focal length in accordance with the distance between the sensor head 20 and the measurement target T.

If appropriate settings cannot be configured (e.g., a necessary amount of received light for measurement cannot be obtained, or the focal length of the objective lens 21 is inappropriate etc.) when the measurement target T is measured, the user may be notified by displaying an error message, an incomplete setting message, or the like in the display unit 31 or outputting such a message to the externally connected device.

In step S12, various measurement conditions are set to measure the measurement target T. For example, the user sets unique calibration data (function etc. for correcting linearity) that the sensor head 20 has by operating the setting unit 32 in the controller 30.

Various parameters may also be set. For example, the sampling time, the measurement range, a threshold for determining whether to regard measurement results as normal or abnormal, or the like are set. Further, a measurement period may be set in accordance with characteristics of the measurement target T, such as the reflectance and material of the measurement target T, and a measurement mode or the like corresponding to the material of the measurement target T may also be set.

Note that these measurement conditions and various parameters are set by operating the setting unit 32 in the controller 30, but may alternatively be set from the externally connected device or may be set by retrieving data from the external storage unit 35.

In step S13, the measurement target T is measured with the sensor head 20 installed in step S11 in accordance with the measurement conditions and various parameters that are set in step S12.

Specifically, in the measurement processor 36 in the controller 30, the wavelength-swept light source projects a light beam, the light-receiving elements receive return beams from the sensor head 20, the signal processing circuit performs, for example, frequency analysis, distance conversion, peak detection, and the like to calculate displacement of the measurement target T (distance to the measurement target T). The details of specific measurement processing will be described later.

In step S14, the result of measurement in step S13 is output. For example, the displacement of the measurement target T (distance to the measurement target T) or the like measured in step S13 is displayed in the display unit 31 in the controller 30 or output to the externally connected device.

In addition, whether the displacement of the measurement target T (distance to the measurement target T) measured in step S13 is in a normal range or is abnormal based on the threshold set in step S12 may also be displayed or output as a measurement result. Furthermore, the measurement conditions, various parameters, the measurement mode, or the like that are set in step S12 may also be displayed or output together.

Overview of System that Includes Displacement Sensor

Figure 3:
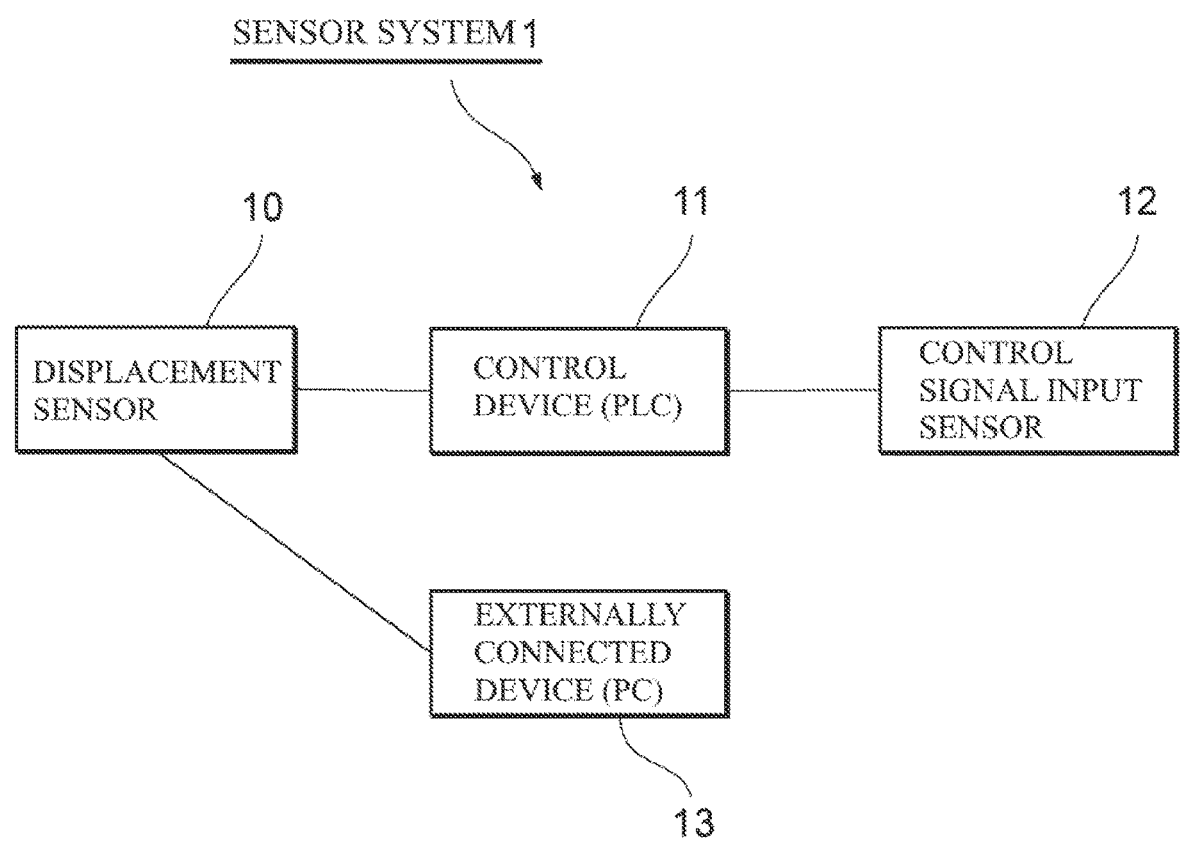
FIG. 3 is a functional block diagram illustrating an overview of a sensor system, such as a sensor system 1 as disclosed herein, that uses a displacement sensor according to one or more embodiments.

FIG. 3 is a functional block showing an overview of a sensor system 1 that uses the displacement sensor 10 according to one or more embodiments. The sensor system 1 includes the displacement sensor 10, a control device 11, a control signal input sensor 12, and an externally connected device 13, as shown in FIG. 3. Note that the displacement sensor 10 is connected to the control device 11 and the externally connected device 13 by a communication cable or an external connection code (which may include an external input line, an external output line, a power line, etc.), for example. The control device 11 and the control signal input sensor 12 are connected by a signal line.

The displacement sensor 10 measures displacement of the measurement target T (distance to the measurement target T), as described with reference to FIGS. 1 and 2. The displacement sensor 10 may also output the measurement results or the like to the control device 11 and the externally connected device 13.

The control device 11 is a PLC (Programmable Logic Controller), for example, and gives the displacement sensor 10 various instructions when the displacement sensor 10 measures the measurement target T.

For example, the control device 11 may output a measurement timing signal to the displacement sensor 10 based on an input signal from the control signal input sensor 12 connected to the control device 11, and may also output a zero-reset command signal (a signal for setting a current measurement value to 0) or the like to the displacement sensor 10.

The control signal input sensor 12 outputs, to the control device 11, an on/off signal to indicate the timing for the displacement sensor 10 to measure the measurement target T. For example, the control signal input sensor 12 may be installed near a production line in which the measurement target T moves, and may output the on/off signal to the control device 11 in response to detecting that the measurement target T has moved to a predetermined position.

The externally connected device 13 is a PC (Personal Computer), for example. The user can configure various setting to the displacement sensor 10 by operating the externally connected device 13.

As a specific example, the measurement mode, the work mode, the measurement period, the material of the measurement target T, and so on are set.

An "internally synchronized measurement mode", in which measurement periodically starts within the control device 11, or an "externally synchronized measurement mode", in which measurement starts in response to an input signal external to the control device 11, and so on can be selected as a setting of the measurement mode.

An "operation mode", in which the measurement target T is actually measured, an "adjustment mode", in which measurement conditions for measuring the measurement target T are set, or the like can be selected as a work mode setting.

The "measurement period" refers to a period for measuring the measurement target T and may be set in accordance with the reflectance of the measurement target T. Even if the measurement target T has a low reflectance, the measurement target T can be appropriately measured by lengthening the measurement period to set an appropriate measurement period.

As a mode for the measurement target T, a "rough surface mode", which is suitable when the components of the reflected beam reflected from the measurement target T include a relatively large diffuse reflection, a "specular mode", which is suitable when the components of the reflected beam include a relatively large specular reflection, an intermediate "standard mode", or the like can be selected.

Thus, the measurement target T can be measured with higher accuracy by configuring appropriate settings in accordance with the reflectance and material of the measurement target T.

Figure 4:
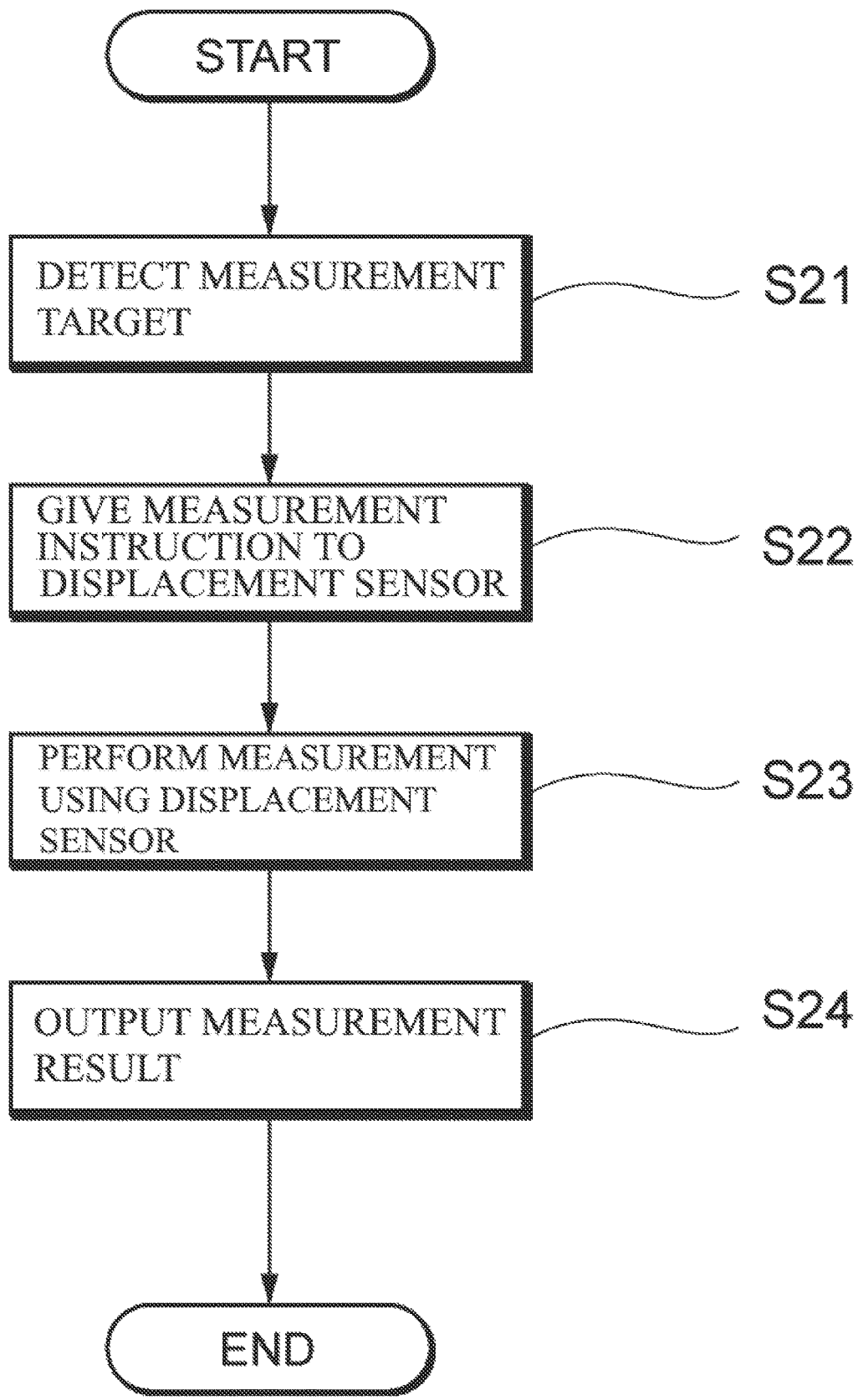
FIG. 4 is a flowchart illustrating a procedure for measuring a measurement target with use of a sensor system that uses a displacement sensor according to one or more embodiments.

FIG. 4 is a flowchart showing a procedure for measuring the measurement target T with use of the sensor system 1 that uses the displacement sensor 10 according to the present disclosure. The procedure shown in FIG. 4, is applicable to the case of the aforementioned externally synchronized measurement mode and includes steps S21 to S24.

In step S21, the sensor system 1 detects the measurement target T, which is an object to be measured. Specifically, the control signal input sensor 12 detects that the measurement target T has moved to a predetermined position on a production line.

In step S22, the sensor system 1 gives an instruction to measure the measurement target T detected in step S21, with use of the displacement sensor 10. Specifically, the control signal input sensor 12 indicates the timing of measuring the measurement target T detected in step S21 by outputting an on/off signal to the control device 11. The control device 11 outputs a measurement timing signal to the displacement sensor 10 based on the on/off signal to give an instruction to measure the measurement target T.

In step S23, the displacement sensor 10 measures the measurement target T. Specifically, the displacement sensor 10 measures the measurement target T based on the measurement instruction received in step S22.

In step S24, the sensor system 1 outputs the result of measurement in step S23. Specifically, the displacement sensor 10 causes the display unit 31 to display the result of measurement processing, and/or outputs the result to the control device 11, the externally connected device 13, or the like via the external I/F unit 33.

Note that the above description has been given, with reference to FIG. 4, of the procedure in the case of the externally synchronized measurement mode in which the measurement target T is measured upon the control signal input sensor 12 detecting the measurement target T. However, there is no limitation thereto. In the case of the internally synchronized measurement mode, for example, an instruction to measure the measurement target T is given to the displacement sensor 10 upon a measurement timing signal being generated based on a preset period, instead of steps S21 and S22.

Figure 5A:
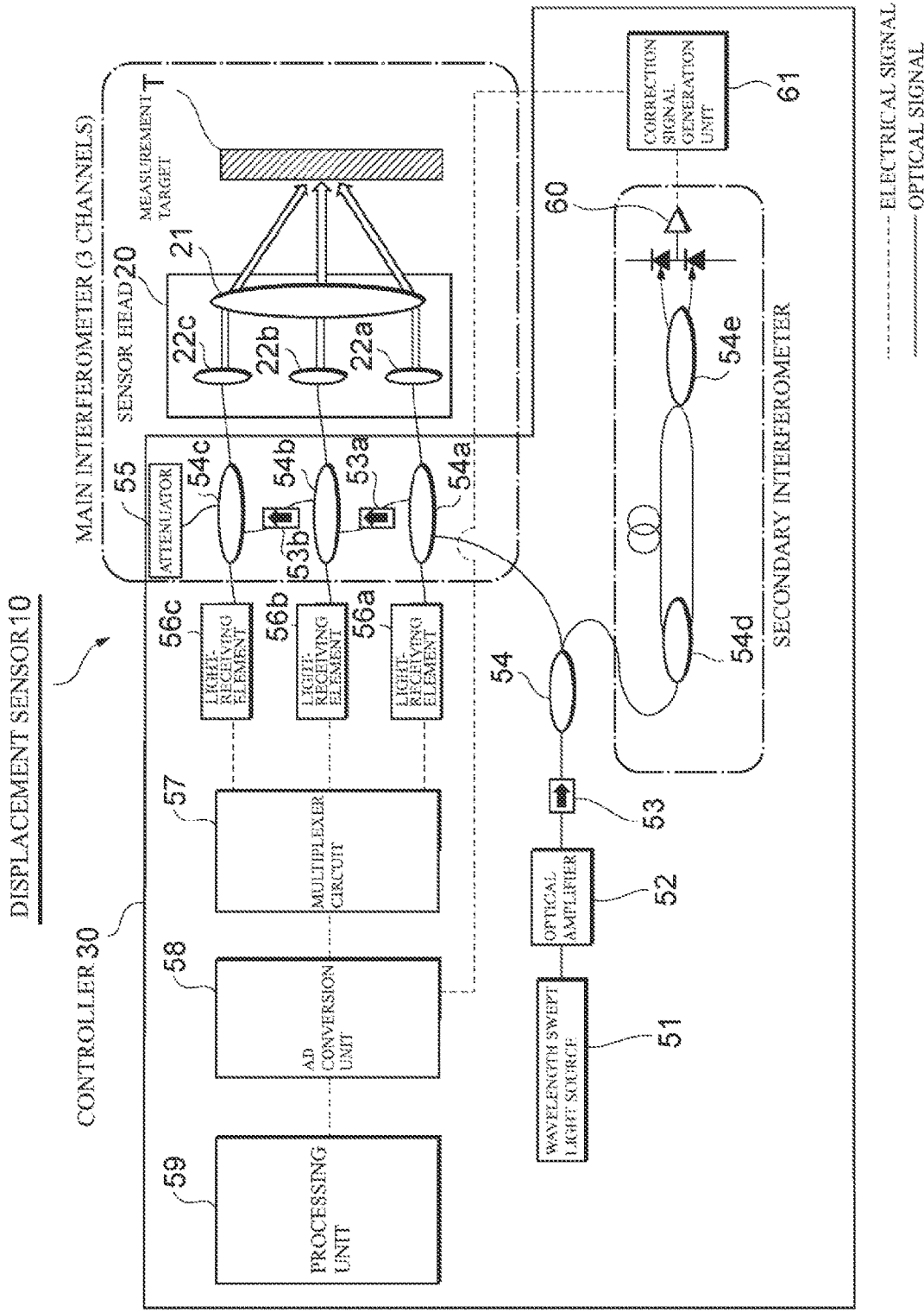
FIG. 5A is a diagram illustrating a principle by which a displacement sensor according to one or more embodiments measures a target object.

Next, a description will be given of the principle by which the displacement sensor 10 according to the present disclosure measures the measurement target T. FIG. 5A is a diagram illustrating a principle by which the displacement sensor 10 according to the present disclosure measures a measurement target T. As shown in FIG. 5A, the displacement sensor 10 includes the sensor head 20 and the controller 30. The sensor head 20 includes the objective lens 21 and a plurality of collimating lenses 22a to 22c. The controller 30 includes a wavelength-swept light source 51, an optical amplifier 52, a plurality of isolators 53, 53a, and 53b, a plurality of optical couplers 54 and 54a to 54e, an attenuator 55, a plurality of light-receiving elements (e.g., photodetectors (PD)) 56a to 56c, a multiplexer circuit 57, an analog-to-digital (AD) conversion unit (e.g., analog-to-digital converter) 58, a processor (e.g., processor) 59, a balance detector 60, and a correction signal generation unit 61.

The wavelength-swept light source 51 projects a wavelength-swept laser beam. The wavelength-swept light source 51 can be realized at low cost by, for example, applying a method of modulating a VCSEL (Vertical Cavity Surface Emitting Laser) with current since mode hopping is unlikely to occur due to a short resonator length, and the wavelength can be easily varied.

The optical amplifier 52 amplifies the beam projected from the wavelength-swept light source 51. In one example or examples, the optical amplifier 52 may be an EDFA (erbium-doped fiber amplifier) and may be dedicated to 1550 nm.

The isolator 53 is an optical element through which an incident light beam is unidirectionally transmitted, and may immediately follow the wavelength-swept light source 51 in order to prevent the effect of noise generated by return beams.

Thus, the light beam projected from the wavelength-swept light source 51 is amplified by the optical amplifier 52, passes through the isolator 53, and is split into beams proceeding to a main interferometer and a secondary interferometer by the optical coupler 54. For example, the optical coupler 54 may split the light beam into the beams proceeding to the main and secondary interferometers at a ratio of 90:10 to 99:1.

The light beam that is split and proceeds to the main interferometer is further split into a beam in a direction toward the measurement target T and a beam in a direction toward the second-stage optical coupler 54b by the first-stage optical coupler 54a.

The light beam that is split in the direction toward the measurement target T by the first-stage optical coupler 54a passes through the collimating lens 22a and the objective lens 21 from the leading end of an optical fiber cable in the sensor head 20, and is radiated toward the measurement target T. Then, a light beam reflected at a reference surface, which is the leading end (end face) of the optical fiber cable, interferes with a light beam reflected at the measurement target T, and an interference beam is generated. The generated interference beam returns to the first-stage optical coupler 54a, and is thereafter received by the light-receiving element 56a and converted into an electrical signal.

The light beam that is split in the direction toward the second-stage optical coupler 54b by the first-stage optical coupler 54a proceeds toward the second-stage optical coupler 54b via the isolator 53a, and is further split in a direction toward the sensor head 20 by the second-stage optical coupler 54b. The light beam that is split in the direction toward the sensor head 20 passes through the collimating lens 22b and the objective lens 21 from the leading end of an optical fiber cable in the sensor head 20, as with the first stage, and is radiated toward the measurement target T. Then, a light beam reflected at a reference surface, which is the leading end (end face) of the optical fiber cable, interferes with a light beam reflected at the measurement target T, and an interference beam is generated. The generated interference beam returns to the second-stage optical coupler 54b, and is split into beams in a direction toward the isolator 53a and a direction toward the light-receiving element 56b by the optical coupler 54b. The light beam that is split in the direction toward the light-receiving element 56b is received by the light-receiving element 56b and converted into an electrical signal. Meanwhile, the isolator 53a is configured to transmit a light beam from the previous-stage optical coupler 54a toward the latter-stage optical coupler 54b and cut off a light beam from the latter-stage optical coupler 54b toward the previous-stage optical coupler 54a. Therefore, the beam split in the direction toward the isolator 53a is cut off.

The light beam that is split in the direction toward the third-stage optical coupler 54c by the second-stage optical coupler 54b proceeds toward the third-stage optical coupler 54c via the isolator 53b, and is further split in the direction toward the sensor head 20 by the third-stage optical coupler 54c. The light beam that is split in the direction toward the sensor head 20 passes through the collimating lens 22c and the objective lens 21 from the leading end of an optical fiber cable in the sensor head 20, as with the first and second stages, and is radiated toward the measurement target T. Then, a light beam reflected at the reference surface, which is the leading end (end face) of the optical fiber cable, interferes with a light beam reflected at the measurement target T, and an interference beam is generated. The generated interference beam returns to the third-stage optical coupler 54c, and is split into beams in a direction toward the isolator 53b and a direction toward the light-receiving element 56c by the optical coupler 54c. The light beam that is split in the direction toward the light-receiving element 56c is received by the light-receiving element 56c and converted into an electrical signal. Meanwhile, the isolator 53b is configured to transmit a light beam from the previous-stage optical coupler 54b toward the latter-stage optical coupler 54c and cut off a light beam from the latter-stage optical coupler 54c toward the previous-stage optical coupler 54b. Therefore, the beam split in the direction toward the isolator 53b is cut off.

Note that the light beam that is split in a direction other than the direction toward the sensor head 20 by the third-stage optical coupler 54c is not used to measure the measurement target T. Therefore, it is favorable to attenuate such a light beam with the attenuator 55, which is a terminator or the like, so as not to be reflected and returned.

Thus, the main interferometer is an interferometer that has three stages of optical paths (three channels) each having an optical path length difference that is twice (round trip) the distance from the leading end (end face) of the optical fiber cable of the sensor head 20 to the measurement target T, and three interference beams corresponding to respective optical path length differences are generated.

The light-receiving elements 56a to 56c receive the interference beams from the main interferometer and generate electrical signals in accordance with the power of the light beams received, as mentioned above.

The multiplexer circuit 57 multiplexes the electrical signals output from the light-receiving elements 56a to 56c.

The AD conversion unit 58 receives the electrical signal from the multiplexer circuit 57 and converts the received electrical signal from an analog signal to a digital signal (AD conversion). Here, the AD conversion unit 58 performs AD conversion based on a correction signal from the correction signal generation unit 61 of the secondary interferometer.

The secondary interferometer obtains the interference signal in order to correct wavelength nonlinearities during the sweep with the wavelength-swept light source 51, and generates a correction signal called a K-clock.

Specifically, the light beam that is split and proceeds to the secondary interferometer by the optical coupler 54 is further split by the optical coupler 54d. Here, the optical paths of the split light beams are configured to have an optical path length difference using optical fiber cables with different lengths between the optical couplers 54d and 54e, and an interference beam corresponding to the optical path length difference is output from the optical coupler 54e, for example. The balance detector 60 receives the interference beam from the optical coupler 54e, and amplifies the optical signal and converts it to an electrical signal while removing noise by taking a difference from a signal of the opposite phase.

Note that the optical coupler 54d and the optical coupler 54e may split the light beam at a ratio of 50:50.

The correction signal generation unit 61 ascertains the wavelength nonlinearities during the sweep with the wavelength-swept light source 51 based on the electrical signal from the balance detector 60, generates a K-clock corresponding to the nonlinearities, and outputs the generated K-clock to the AD conversion unit 58.

Due to the wavelength nonlinearities during the sweep with the wavelength-swept light source 51, the wave intervals of the analog signal input to the AD conversion unit 58 from the main interferometer are not equal. The AD conversion unit 58 performs AD conversion (sampling) while correcting the sampling time based on the aforementioned K-clock so that the wave intervals are equal.

Note that the K-clock is a correction signal used to sample the analog signal of the main interferometer, as mentioned above. Therefore, the K-clock needs to be generated so as to have a higher frequency than the analog signal of the main interferometer. Specifically, the optical path length difference provided between the optical coupler 54d and the optical coupler 54e in the secondary interferometer may be longer than optical path length differences between the leading ends (end faces) of the optical fiber cables in the main interferometer and the measurement target T. Alternatively, the correction signal generation unit 61 may increase the frequency by multiplication (e.g., by a factor of 8, etc.).

The processor 59 obtains the digital signal that has been subjected to AD conversion with its nonlinearities corrected by the AD conversion unit 58, and calculates displacement of the measurement target T (distance to the measurement target T) based on the obtained digital signal. Specifically, the processor 59 performs frequency conversion on the digital signal using fast Fourier transform (FFT), and calculates the distance by analyzing them. The details of processing at the processor 59 will be described later.

Note that the processor 59 is required to perform high-speed processing, and is therefore realized by an integrated circuit such as an FPGA (field-programmable gate array) in many cases.

Here, the multiplexer circuit 57 is arranged on the upstream side of the AD conversion unit 58, but may alternatively be arranged on the downstream side of the AD conversion unit 58. The output from the plurality of light-receiving elements 56a to 56c may be separately subjected to AD conversion and then multiplexed by the multiplexer circuit 57.

Also, here, three stages of optical paths are provided in the main interferometer. The sensor head 20 radiates measurement beams from the respective optical paths toward the measurement target T, and the distance to the measurement target T, for example, is measured based on interference beams (return beams) obtained from the respective optical paths (multichannel). The number of channels in the main interferometer is not limited to three, and may alternatively be one or two, or may be four or more.

Figure 5B:
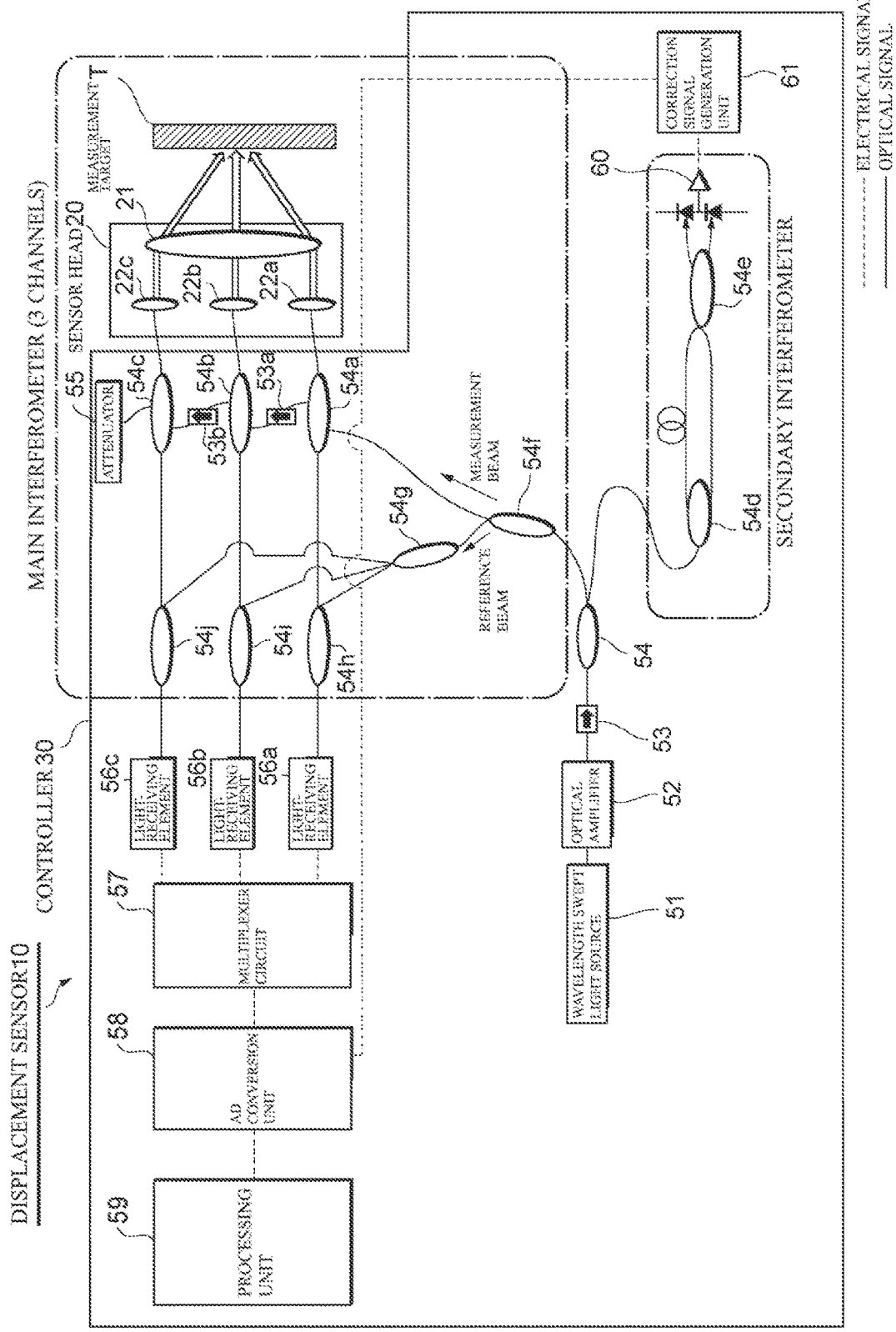
FIG. 5B is a diagram illustrating another principle by which a displacement sensor according to one or more embodiments measures a measurement target.

FIG. 5B is a diagram illustrating another principle by which a displacement sensor 10 according to the present disclosure may measure the measurement target T. As shown in FIG. 5B, the displacement sensor 10 includes a sensor head 20 and a controller 30. The sensor head 20 includes an objective lens 21 and a plurality of collimating lenses 22a to 22c. The controller 30 includes a wavelength-swept light source 51, an optical amplifier 52, a plurality of isolators 53, 53a and 53b, a plurality of optical couplers 54 and 54a to 54j, an attenuator 55, a plurality of light-receiving elements (e.g., photodetectors (PD)) 56a to 56c, a multiplexer circuit 57, an analog-to-digital (AD) conversion unit (e.g., analog-to-digital converter) 58, a processor (e.g., processor) 59, a balance detector 60, and a correction signal generation unit 61. The displacement sensor 10 shown in FIG. 5B has a configuration different from that of the displacement sensor 10 shown in FIG. 5A mainly in that the former has the optical couplers 54f to 54j. A principle of the different configuration will be described in detail in comparison with FIG. 5A.

The light beam projected from the wavelength-swept light source 51 is amplified by the optical amplifier 52, and is split into a beam proceeding to the main interferometer side and a beam proceeding to the secondary interferometer side by the optical coupler 54 via the isolator 53. The light beam that is split and proceeds to the main interferometer side is further split into a measurement beam and a reference beam by the optical coupler 54f.

The measurement beam is caused to pass through the collimating lens 22a and the objective lens 21 by the first-stage coupler 54a and radiated to the measurement target T, and is reflected at the measurement target T, as described with reference to FIG. 5A. Here, in FIG. 5A, the light beam reflected at the reference surface, which is the leading end (end face) of an optical fiber cable, interferes with the light beam reflected at the measurement target T, and an interference beam is generated. Meanwhile, in FIG. 5B, the reference surface that reflects the light beam is not provided. In other words, in FIG. 5B, the light that is reflected at the reference surface as in FIG. 5A is not generated in FIG. 5B, and therefore, the measurement beam reflected at the measurement target T returns to the first-stage optical coupler 54a.

Similarly, the light beam that is split in the direction toward the second-stage optical coupler 54b from the first-stage optical coupler 54a is caused to pass through the collimating lens 22b and the objective lens 21 by the second-stage optical coupler 54b and radiated toward the measurement target T, and is reflected at the measurement target T and returns to the second-stage optical coupler 54b. The light beam that is split in the direction toward the third-stage optical coupler 54c from the second-stage optical coupler 54b is caused to pass through the collimating lens 22c and the objective lens 21 by the third-stage optical coupler 54c and radiated toward the measurement target T, and is reflected at the measurement target T and returns to the third-stage optical coupler 54c.

The reference beam split by the optical coupler 54f is further split into beams proceeding to the optical couplers 54h, 54i, and 54j by the optical coupler 54g.

In the optical coupler 54h, the measurement beam that has been reflected at the measurement target T and output from the optical coupler 54a interferes with the reference beam output from the optical coupler 54g, and an interference beam is generated. The generated interference beam is received by the light-receiving element 56a and converted into an electrical signal. In other words, a light beam is split into the measurement beam and the reference beam by the optical coupler 54f, an interference beam is generated in correspondence with the optical path length difference between the optical path of the measurement beam (an optical path in which the light beam from the optical coupler 54f is reflected at the measurement target T via the optical coupler 54a, the collimating lens 22a and the objective lens 21 and reaches the optical coupler 54h) and the optical path of the reference beam (an optical path in which the light beam from the optical coupler 54f reaches the optical coupler 54h via the optical coupler 54g). The generated interference beam is received by the light-receiving element 56a and converted into an electrical signal.

Similarly, in the optical coupler 54i, an interference beam is generated in correspondence with the optical path length difference between the optical path of the measurement beam (an optical path in which the light beam from the optical coupler 54f is reflected at the measurement target T via the optical couplers 54a and 54b, the collimating lens 22b, and the objective lens 21 and reaches the optical coupler 54i) and the optical path of the reference beam (an optical path in which the light beam from the optical coupler 54f reaches the optical coupler 54i via the optical coupler 54g). The generated interference beam is received by the light-receiving element 56b and converted into an electrical signal.

In the optical coupler 54j, an interference beam is generated in correspondence with the optical path length difference between the optical path of the measurement beam (an optical path in which the light beam from the optical coupler 54f is reflected at the measurement target T via the optical couplers 54a, 54b, and 54c, the collimating lens 22c, and the objective lens 21 and reaches the optical coupler 54j) and the optical path of the reference beam (an optical path in which the light beam from the optical coupler 54f reaches the optical coupler 54j via the optical coupler 54g). The generated interference beam is received by the light-receiving element 56c and converted into an electrical signal. Note that the light-receiving elements 56a to 56c may be balance photodetectors, for example.

Thus, the main interferometer has three stages of optical paths (three channels), and generates three interference beams corresponding to the respective optical path length differences between the measurement beams that are reflected at the measurement target T and input to the optical couplers 54h, 54i, and 54j and the reference beams that are input to the optical couplers 54h, 54i, and 54j via the optical couplers 54f and 54g.

Note that the optical path length difference between a measurement beam and a reference beam may also be set so as to be different among the three channels. For example, the optical path lengths from the optical coupler 54g may be different among the optical couplers 54h, 54i, and 54j.

The distance to the measurement target T or the like is measured based on the interference beams obtained from respective optical paths (multichannel).

Configuration of Sensor Head

Figure 6A:
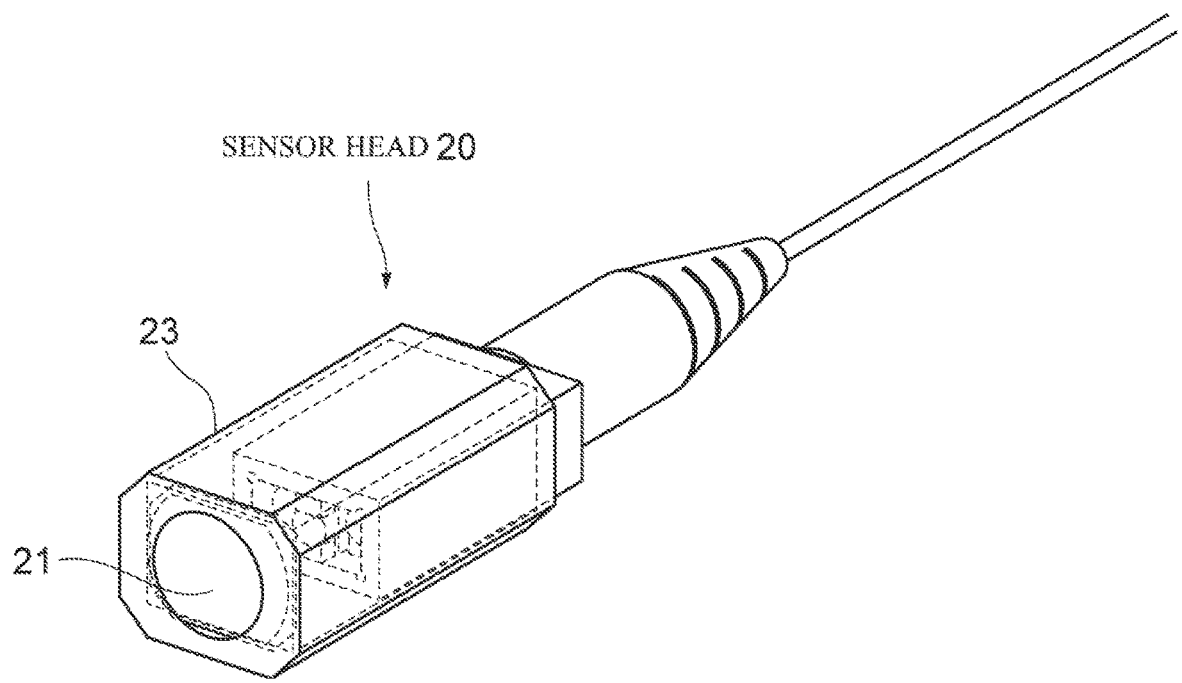
FIG. 6A is a diagram illustrating a perspective view of a schematic configuration of a sensor head, such as a sensor head 20 as disclosed herein.
Figure 6B:
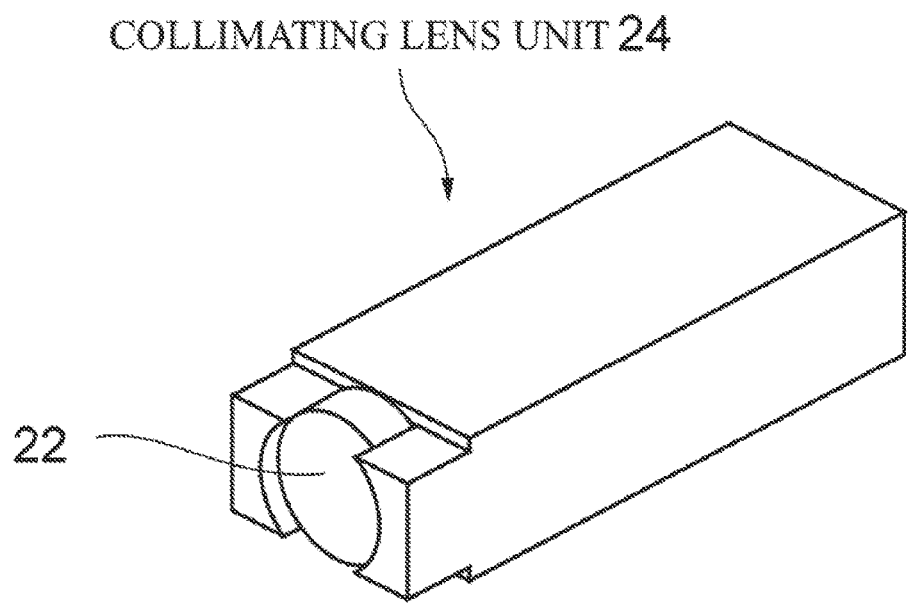
FIG. 6B is a diagram illustrating a perspective view of a schematic configuration of a collimating lens holder arranged within a sensor head.
Figure 6C:
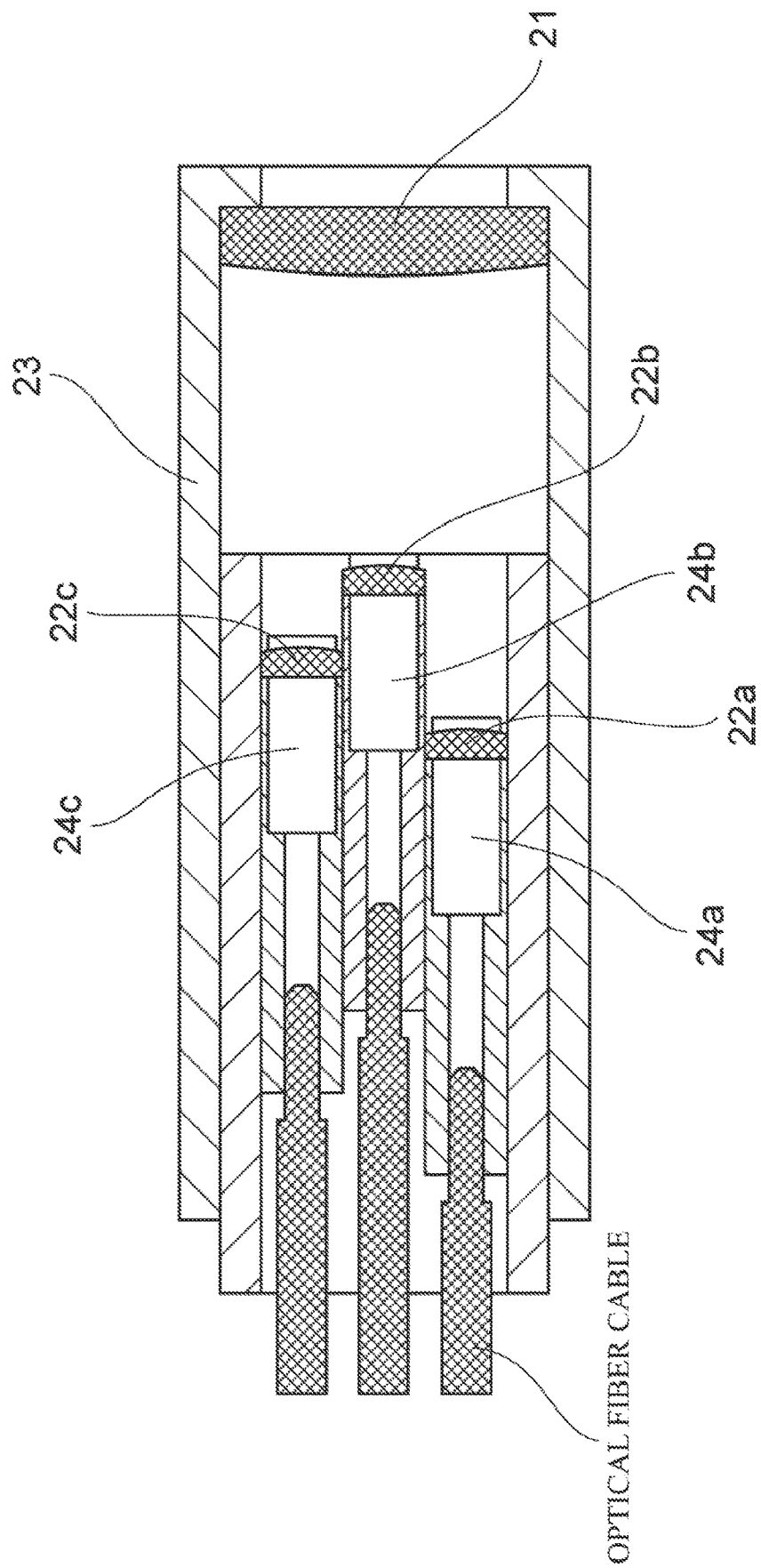
FIG. 6C is a diagram illustrating a cross-sectional view of an internal structure of a sensor head.

Here, a structure of the sensor head used in the displacement sensor 10 will be described. FIG. 6A is a perspective view showing a schematic configuration of the sensor head 20. FIG. 6B is a perspective view of a schematic configuration of a collimating lens holder arranged within the sensor head 20. FIG. 6C is a cross-sectional view of an internal structure of the sensor head.

In the sensor head 20, the objective lens 21 and the collimating lenses are accommodated in an objective lens holder 23, as shown in FIG. 6A. For example, the individual sides of the objective lens holder 23 that surround the objective lens 21 are about 10 mm long, and the objective lens holder 23 is about 22 mm in length in the optical axis direction.

As shown in FIG. 6B, a collimating lens unit 24 is formed by adhering a collimating lens 22 to the collimating lens holder using an adhesive material. The spot diameter can be adjusted by inserting an optical fiber cable, in accordance with the amount of insertion. The diameter of each collimating lens 22 is about 2 mm, for example.

Three collimating lenses 22a to 22c are held by the collimating lens holder, constituting collimating lens units 24a to 24c, and three optical fiber cables are inserted into the respective collimating lens units 24a to 24c in correspondence with the three collimating lenses 22a to 22c, as shown in FIG. 6C. Note that the three optical fiber cables may alternatively be held by the collimating lens holder.

These optical fiber cables and the collimating lens units 24a to 24c are held together with the objective lens 21 by the objective lens holder 23 and constitute the sensor head 20.

Here, the three collimating lens units are shifted with respect to each other so as to form different optical path length differences in terms of their positions in the optical axis direction in the sensor head 20, as shown in FIG. 6C.

The objective lens holder 23 and the collimating lens units 24a to 24c that constitute the sensor head 20 may be made of a metal material (e.g., A2017) that has high strength and can be processed with high accuracy.

Figure 7:
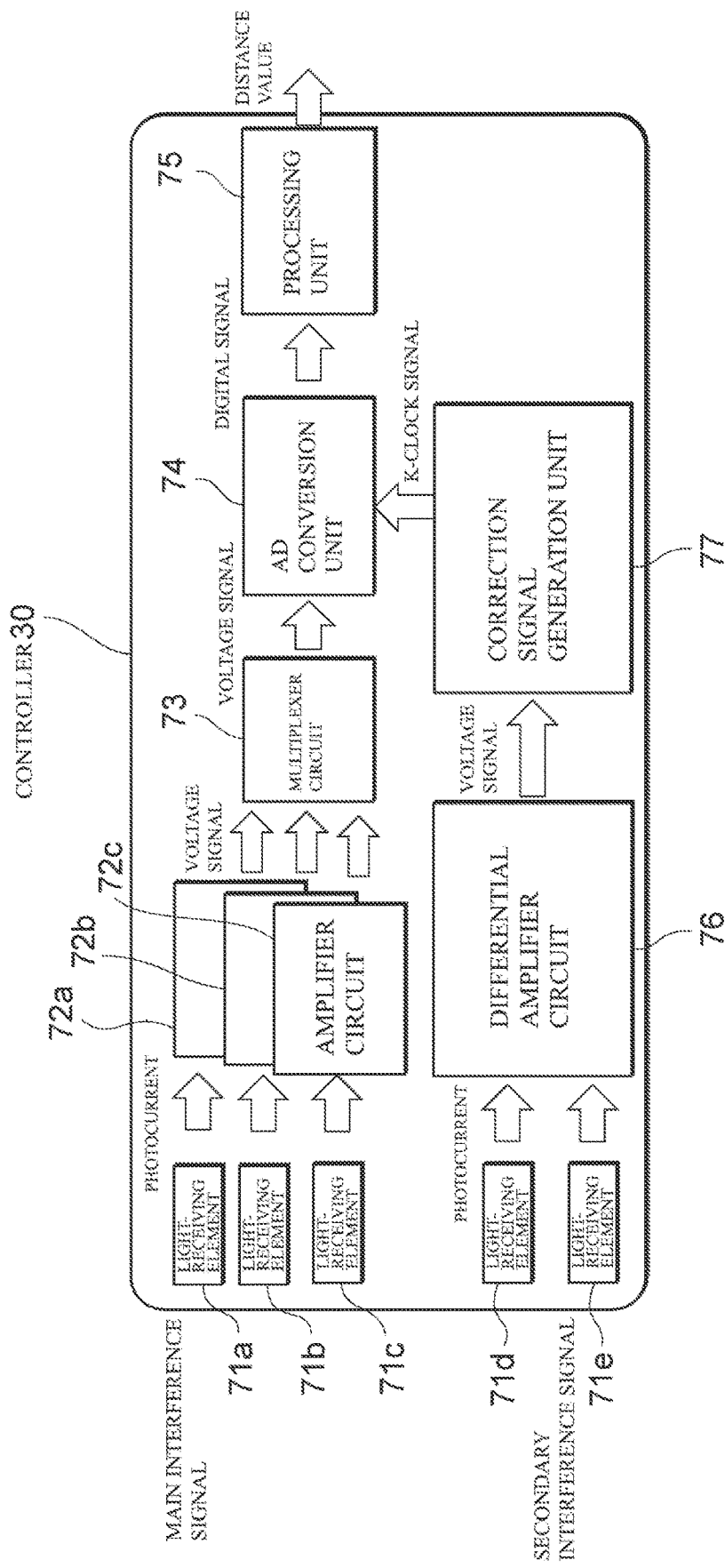
FIG. 7 is a block diagram illustrating signal processing performed by a controller, such as a controller 30 as disclosed herein.

FIG. 7 is a block diagram illustrating signal processing in the controller 30. As shown in FIG. 7, the controller 30 includes a plurality of light-receiving elements 71a to 71e, a plurality of amplifier circuits 72a to 72c, a multiplexer circuit 73, an AD conversion unit 74, a processor 75, a differential amplifier circuit 76, and a correction signal generation unit 77.

In the controller 30, the light beam projected from the wavelength-swept light source 51 is split into a beam proceeding to the main interferometer and a beam proceeding to the secondary interferometer by the optical coupler 54, and the value of the distance to the measurement target T is calculated by processing main interference signals and secondary interference signals obtained respectively from the main and secondary interferometers, as illustrated in FIG. 5A.

The plurality of light-receiving elements 71a to 71c correspond to the light-receiving elements 56a to 56c shown in FIG. 5A, receive the main interference signals from the main interferometer, and output the received signals as current signals to the amplifier circuits 72a to 72c, respectively.

The plurality of amplifier circuits 72a to 72c convert the current signals to voltage signals (I-V conversion) and amplify these signals.

The multiplexer circuit 73 multiplexes the voltage signals output from the amplifier circuits 72a to 72c and outputs the multiplexed signal as one voltage signal to the AD conversion unit 74.

The AD conversion unit 74 corresponds to the AD conversion unit 58 shown in FIG. 5A, and converts the voltage signal to a digital signal (AD conversion) based on a K-clock from the later-described correction signal generation unit 77.

The processor 75 corresponds to the processor 59 shown in FIG. 5A, converts the digital signal from the AD conversion unit 74 to a frequency by means of FFT, analyzes the frequency, and calculates the value of the distance to the measurement target T.

The plurality of light-receiving elements 71d to 71e and the differential amplifier circuit 76, which correspond to the balance detector 60 shown in FIG. 5A, receive interference beams in the secondary interferometer, output interference signals one of which has an inverted phase, and amplify the interference signals and convert these signals to a voltage signal while removing noise by taking a difference between the two signals.

The correction signal generation unit 77 corresponds to the correction signal generation unit 61 shown in FIG. 5A, binarizes the voltage signal using a comparator, generates a K-clock, and outputs the generated K-clock to the AD conversion unit 74. The K-clock needs to be generated so as to have a higher frequency than the analog signal of the main interferometer. Therefore, the correction signal generation unit 77 may increase the frequency by multiplication (e.g., by a factor of 8 etc.).

Although the multiplexer circuit 73 in the controller 30 shown in FIG. 7 is arranged on the upstream side of the AD conversion unit 74, it may alternatively be arranged on the downstream side of the AD conversion unit 74. The output from the plurality of light-receiving elements 71a to 71c and the plurality of amplifier circuits 72a to 72c may be subjected to AD conversion, and may thereafter be multiplexed by the multiplexer circuit 73.

Figure 8:
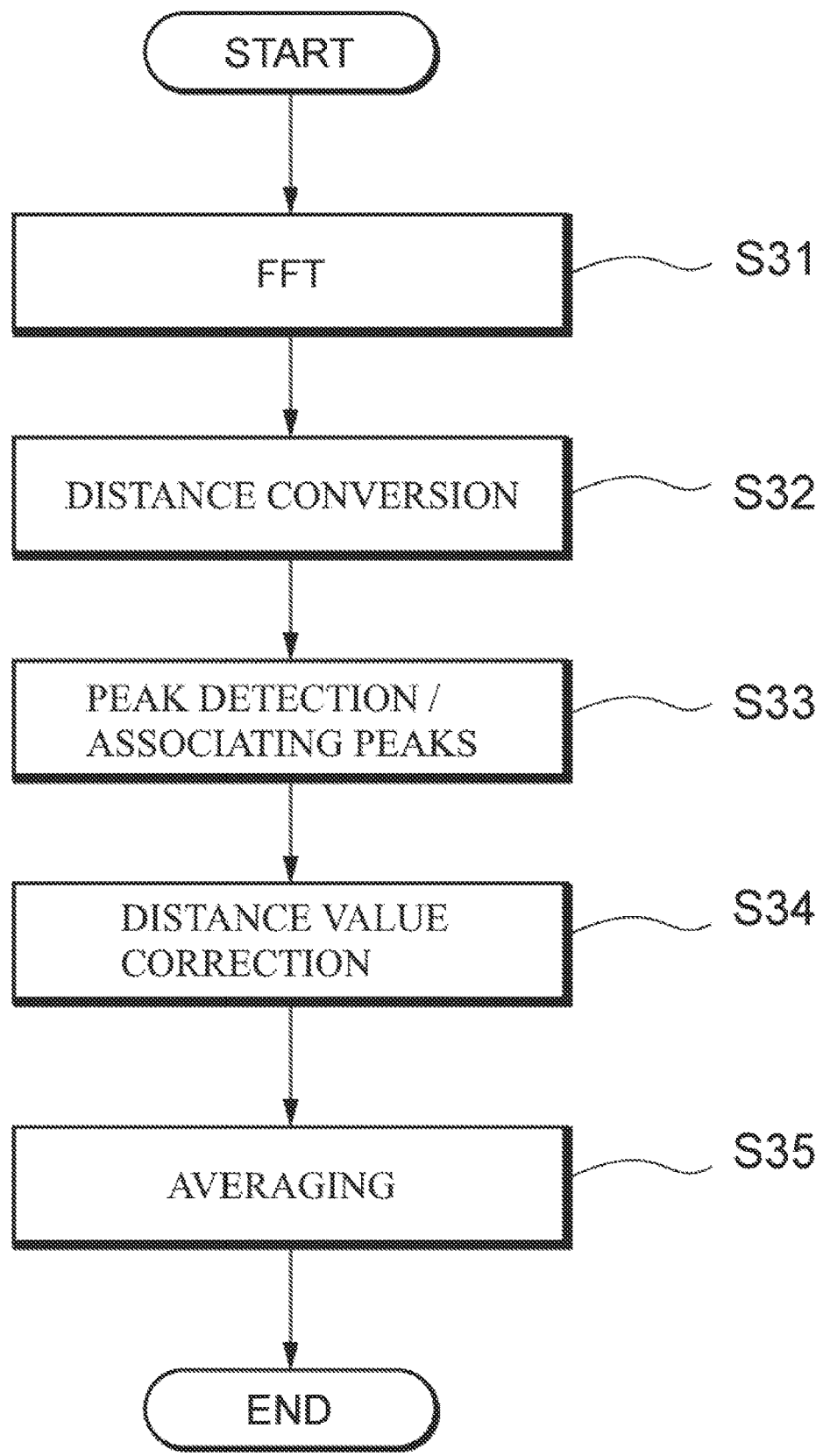
FIG. 8 is a flowchart illustrating a method for calculating a distance to a measurement target that is executed by a processor, such as a processor 59 as disclosed herein, of a controller.

FIG. 8 is a flowchart showing a method for calculating the distance to the measurement target T that is executed by the processor 59 in the controller 30. The illustrated method includes steps S31 to S35, as shown in FIG. 8.

Figure 9A:
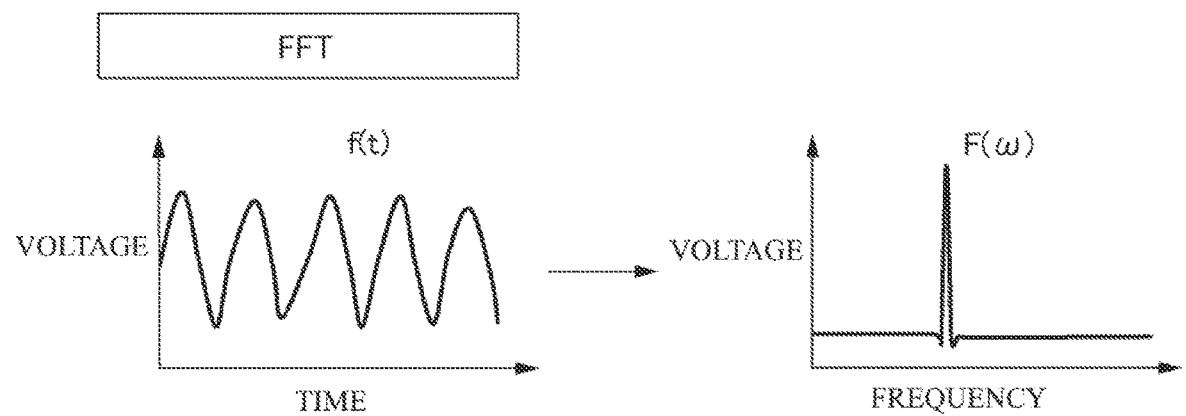
FIG. 9A is a diagram illustrating how a waveform signal (voltage vs time) is subjected to frequency conversion into a spectrum (voltage vs frequency).

In step S31, the processor 59 performs frequency conversion on a waveform signal (voltage vs time) into a spectrum (voltage vs frequency) by means of the following Fast Fourier Transform (FFT) shown in Equation 2. FIG. 9A shows how the waveform signal (voltage vs time) is subjected to frequency conversion into the spectrum (voltage vs frequency).

$$\sum_{t=0}^{N-1} f(t) \exp\left(-i\frac{2\pi \omega t}{N}\right) = F(\omega) \qquad \text{(Equation 2)}$$

where N=a number of data points

Figure 9B:
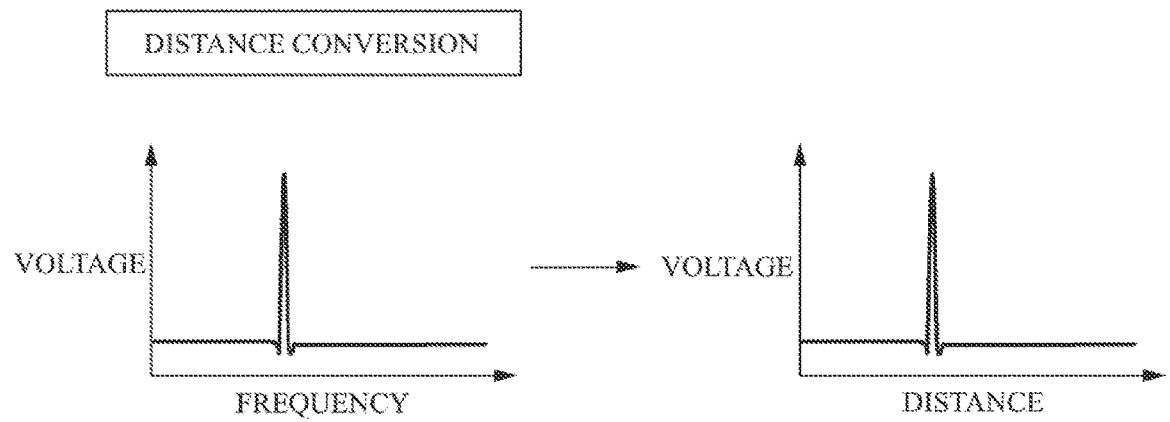
FIG. 9B is a diagram illustrating how a spectrum (voltage vs frequency) is subjected to distance conversion into a spectrum (voltage vs distance).

In step S32, the processor 59 performs distance conversion on the spectrum (voltage vs frequency) into a spectrum (voltage vs distance). FIG. 9B shows how the spectrum (voltage vs frequency) is subjected to distance conversion into the spectrum (voltage vs distance).

Figure 9C:
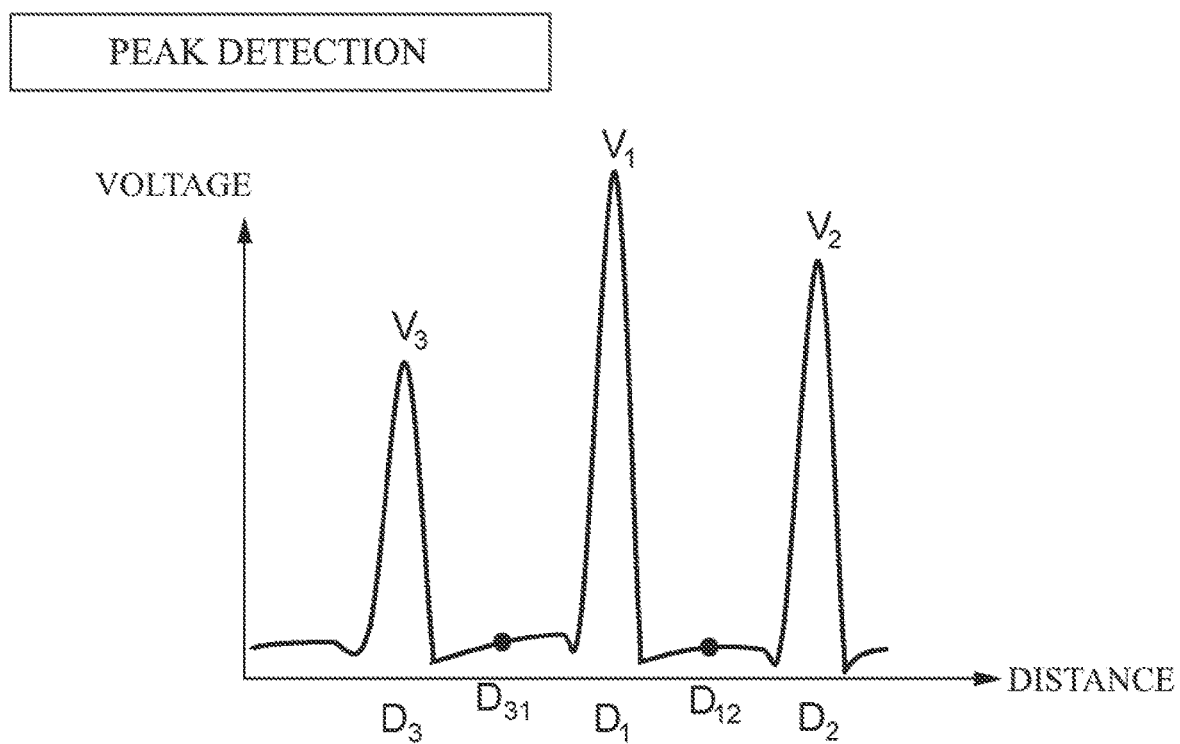
FIG. 9C is a diagram illustrating how a value (distance, SNR) corresponding to a peak is calculated based on a spectrum (voltage vs distance).

In step S33, the processor 59 calculates values (distance value, SNR) corresponding to peaks based on the spectrum (voltage vs distance). FIG. 9C shows how the values (distance, SNR) corresponding to peaks are calculated based on the spectrum (voltage vs distance).

(1) Peak values of voltage are calculated. Specifically, pairs (Dx, Vx) of a distance value and a voltage value at a distance at which the differential value of the voltage goes from positive to negative are created with respect to the voltage shown in FIG. 9C, and are arranged in descending order of the voltage value, i.e. (D1, V1), (D2, V2), (D3, V3), . . . , (Dn, Vn).

(2) Any combination with which the number of multiple heads is exceeded is excluded. For example, the displacement sensor 10 is provided with three stages of optical paths in the main interferometer, the sensor head 20 radiates measurement beams from the respective optical paths toward the measurement target T, and interference beams (return beams) obtained from the respective optical paths are received (the number of multiple heads=3), as shown in FIG. 5A. If there are four or more peaks, any peak in excess of three derives from noise, and may therefore be excluded from the calculation target. If the number of multiple heads is three, the pairs are (D1, V1), (D2, V2), and (D3, V3).

(3) The obtained pairs are rearranged in the order of distance. If the pairs are arranged in the ascending order of distance, they are arranged in the order of (D3, V3), (D1, V1), and (D2, V2).

(4) Peak-to-peak voltages are obtained. Specifically, a voltage V31 at an intermediate distance D31 between D3 and D1 is obtained, and a voltage V12 at an intermediate distance D12 between D1 and D2 is obtained. Then, an average voltage Vn of these voltages is calculated with an expression: $Vn=(V31+V12)/2$.

(5) Respective SNRs are calculated. Specifically, the following SNRs are obtained: $SN1=V1/Vn$, $SN2=V2/Vn$, and $SN3=V3/Vn$.

Thus, the values corresponding to the peaks are calculated as (distance value, SNR)=(D1, SN1), (D2, SN2), (D3, SN3) based on the spectrum (voltage vs. distance).

Returning to FIG. 8, in step S34, the processor 59 corrects the distance values out of the values (distance value, SNR) corresponding to the peaks that are calculated in step S33. Specifically, the three collimating lens units 24a to 24c (collimating lenses 22a to 22c and the optical fiber cables) are shifted from each other in terms of the position in the optical axis direction of the sensor head 20, as shown in FIG. 6C. Therefore, the distance values D1, D2, and D3 corresponding to the respective peaks are corrected in accordance with the shift amounts (e.g., h1, h2, h3 etc.).

As a result, the values corresponding to the peaks are calculated as (corrected distance value, SNR)=(D1+h1, SN1), (D2+h2, SN2), (D3+h3, SN3).

In step S35, the processor 59 averages the distance values out of the values corresponding to the peaks (corrected distance value, SNR) that are calculated in step S34. Specifically, it is favorable that the processor 59 averages those corrected distance values with an SNR that has at least a threshold value out of the values (corrected distance value, SNR) corresponding to the peaks, and outputs the result of the averaging calculation as the distance to the measurement object T.

Next, a specific embodiment of the present disclosure will be described in detail, focusing on more characteristic configurations, functions, and properties. Note that the following optical interference range sensor 10 described with reference to FIGS. 1 to 9. Some or all of the basic configurations, functions, and properties included in the present optical interference range sensor are common to the configurations, functions, and properties included in the displacement sensor 10 described with reference to FIGS. 1 to 9.

Embodiment

Configuration of Optical Interference Range Sensor

Figure 10:
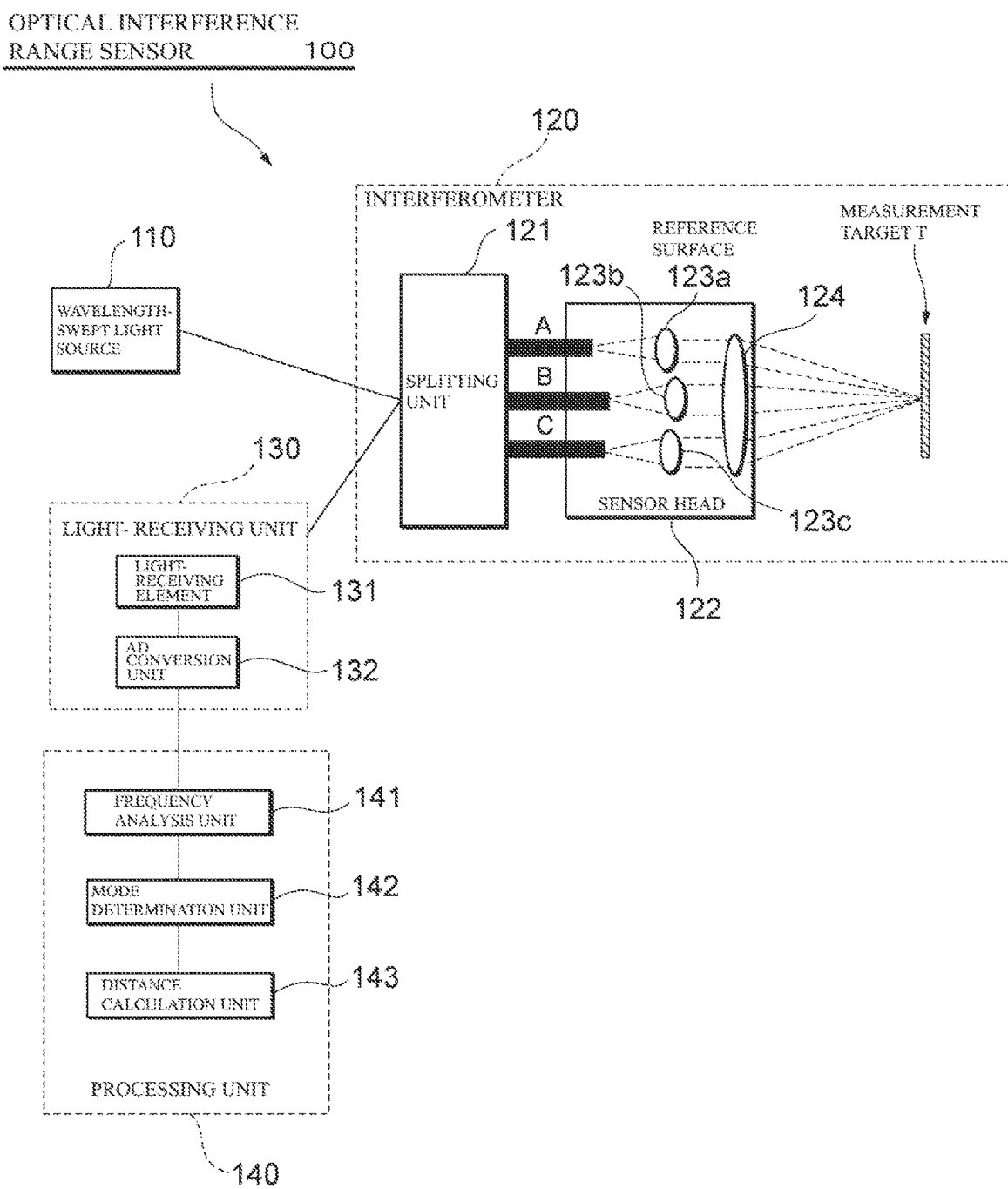
FIG. 10 is a schematic diagram illustrating a schematic configuration of an optical interference range sensor, such as an optical interference range sensor 100 as disclosed herein, according to one or more embodiments.

FIG. 10 is a schematic diagram showing a schematic configuration of an optical interference ranging sensor 100 according to one or more embodiments. As shown in FIG. 10, the optical interference ranging sensor 100 includes a wavelength-swept light source 100, an interferometer 120, a light-receiving unit 130, and a processor 140. Note that the interferometer 120 includes a splitting unit 121 and a sensor head 122. The light-receiving unit 130 includes a light-receiving element 131 and an AD conversion unit 132. The processor 140 includes a frequency analysis unit 141, a mode determination unit 142, and a distance calculation unit 143.

Further, the splitting unit 121 splits an input light beam into light beams proceeding to a plurality of optical paths, which are guided to the sensor head 122 via respective optical fiber cables. The sensor head 122 includes collimating lenses 123a to 123c arranged for respective optical paths, as shown in FIG. 6A to 6C, for example. An objective lens 124 is also attached to or included in the sensor head 122.

The wavelength-swept light source 110 is connected to the splitting unit 121 and projects a light beam while continuously varying the wavelength thereof.

The splitting unit 121 splits the input light beam projected from the wavelength-swept light source 110 into beams with optical paths A to C and outputs the split light beams so as to radiate these light beams toward a plurality of (here, three) spots on the measurement target T. The splitting unit 121 may be an optical coupler or the like, for example.

The light beam that is split into the optical path A serves as a measurement beam, passes through the collimating lens 123a and the objective lens 124 via an optical fiber cable, and is radiated toward the measurement target T and reflected at the measurement target T. The reflected beam (first reflected beam) that has been reflected at the measurement target T returns to the splitting unit 121 from the leading end of the optical fiber through the objective lens 124 and the collimating lens 123a.

Also, the light beam that is split into the optical path A serves as a measurement beam and is radiated toward the measurement target T via an optical fiber cable, but a part of the light beam serves as a reference beam and is reflected at a reference surface. Here, the leading end of the optical fiber cable serves as the reference surface, and the reflected beam (second reflected beam) reflected at the reference surface returns to the splitting unit 121 via the optical fiber cable.

Here, regarding the light beams output from the splitting unit 121 to the optical fiber cable in the optical path A, the measurement beam is radiated toward the measurement target T and returns as the first reflected beam to the splitting unit 121 via the optical fiber cable, and the reference beam returns as the second reflected beam, which is reflected at the reference surface that is the leading end of the optical fiber cable, to the splitting unit 121 via the optical fiber cable. Therefore, an interference beam is generated in accordance with an optical path length difference between the measurement beam and the reference beam. In other words, the optical path length difference is the round-trip distance from the leading end of the optical fiber cable in the optical path A to the measurement target T. The interferometer 120 generates an interference beam by interference between the first and second reflected beams, and the generated interference beam serves as a return beam to the splitting unit 121. Note that both the optical path lengths of the measurement beam and the reference beam may have values that are obtained by multiplying the spatial length of the optical path by a refractive index.

Similarly, the light beam that is split into the optical path B serves as a measurement beam, passes through the collimating lens 123b and the objective lens 124 via an optical fiber cable, and is radiated toward the measurement target T and reflected at the measurement target T. The reflected beam (first reflected beam) that has been reflected at the measurement target T returns to the splitting unit 121 from the leading end of the optical fiber through the objective lens 124 and the collimating lens 123b. A part of the light beam that is split into the optical path B serves as a reference beam and is reflected at a reference surface that is the leading end of the optical fiber cable. The reflected beam (second reflected beam) reflected at the reference surface returns to the splitting unit 121 via the optical fiber cable.

Thus, an interference beam is generated in accordance with an optical path length difference between the measurement beam and the reference beam of the light beam output from the splitting unit 121 to the optical fiber cable in the optical path B. In other words, the optical path length difference is the round-trip distance from the leading end of the optical fiber cable in the optical path B to the measurement target T. The interferometer 120 generates an interference beam by interference between the first and second reflected beams, and the generated interference beam serves as a return beam to the split unit 121.

Similarly, the light beam that is split into the optical path C serves as a measurement beam, passes through the collimating lens 123c and the objective lens 124 via an optical fiber cable, and is radiated toward the measurement target T and reflected at the measurement target T. The reflected beam (first reflected beam) that has been reflected at the measurement target T returns to the splitting unit 121 from the leading end of the optical fiber through the objective lens 124 and the collimating lens 123c. A part of the light beam that is split into the optical path C serves as a reference beam and is reflected at a reference surface that is the leading end of the optical fiber cable. The reflected beam (second reflected beam) reflected at the reference surface returns to the splitting unit 121 via the optical fiber cable.

Thus, an interference beam is generated in accordance with an optical path length difference between the measurement beam and the reference beam of the light beam output from the splitting unit 121 to the optical fiber cable in the optical path C. In other words, the optical path length difference is the round-trip distance from the leading end of the optical fiber cable in the optical path C to the measurement target T. The interferometer 120 generates an interference beam by interference between the first and second reflected beams, and the generated interference beam serves as a return beam to the splitting unit 121.

Thus, the input light beam projected from the wavelength-swept light source 110 is split by the splitting unit 121. In the optical paths A to C of the split beams, interference beams are generated that depend on the optical path length differences between the measurement beams radiated toward the respective spots on the measurement target T and the reference beams reflected at the reference surfaces that are the leading ends of the respective optical fiber cables in the optical paths A to C. These interference beams are output as return beams to the light-receiving unit 130 by the interferometer 120.

Note that the optical path length difference between each measurement beam and a corresponding reference beam is set so as to be different among the three spots (corresponding to the respective optical paths A to C).

The light-receiving unit 130 receives the return beams (interference beams) from the interferometer 120. The light-receiving element 131 in the light-receiving unit 130, which is a photodetector, for example, receives the return beams output from the interferometer 120, and converts the received beams to electrical signals. The AD conversion unit 132 converts these electrical signals from analog signals to digital signals.

Note that, here, the light-receiving unit 130 may be configured to receive, as a single light-receiving unit, the optical signals including the interference beams corresponding to the three spots (corresponding to the optical paths A to C) as the return beams from the interferometer 120, instead of receiving the interference beams with separate light-receiving sub-units. Accordingly, a simple configuration at low cost may be realized.

The processor 140 calculates the distance to the measurement target T based on the return beams received by the light-receiving unit 130. Specifically, the processor 140 calculates the distance to the measurement target T by detecting peaks of the return beams received by the light-receiving unit 130 and associating the detected peaks with the aforementioned spots (corresponding to the optical paths A to C). Also, for example, the processor 140 is a processor realized by an integrated circuit such as an FPGA, and may perform frequency conversion on the input digital signals by means of FFT and calculate the distance to the measurement target T based on the frequency conversion results.

More specifically, for example, the frequency analysis unit 141 in the processor 140 performs frequency analysis on a digital signal from the AD conversion unit 132 in the light-receiving unit 130 by means of FFT, as in step S31 shown in FIG. 8.

Figure 11:
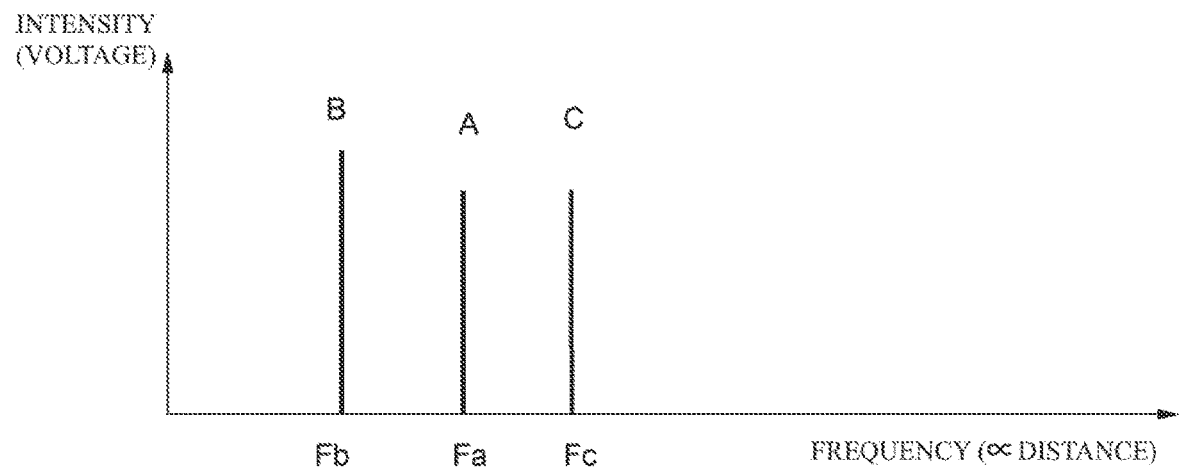
FIG. 11 a schematic diagram illustrating an example of a signal waveform of return beams received by a light-receiving unit, such as a light-receiving unit 130 as disclosed herein, after being subjected to frequency conversion by means of FFT.

FIG. 11 schematically shows an example of a signal waveform of return beams received by the light-receiving unit 130 after being subjected to frequency conversion by means of FFT. As shown in FIG. 11, peaks corresponding to three spots (corresponding to the optical paths A to C) appear in the return beams received by the light-receiving unit 130.

Ordinarily, an optical interference range sensor having multiple heads (here, the number of multiple heads is three) calculates the distance to the measurement target T based on peaks corresponding to three detected spots (corresponding to the optical paths A to C). As mentioned above, the optical paths A to C are set so that the optical path length difference between the measurement beam and the reference beam is made different among the light beams split in correspondence with the three spots. Specifically, the leading end positions of the optical fiber cables arranged in the optical paths A to C are shifted with respect to each other in the optical axis direction. Therefore, the processor 140 corrects distance values corresponding to frequencies Fa to Fc in accordance with the shift amounts, and calculates the distance to the measurement target T by averaging these distance values corrected in accordance with the shift amounts. As for the leading end positions of the optical fiber cables, the collimating lens units into which the leading ends of the respective optical fiber cables are inserted may be shifted in terms of the position in the optical axis direction, as shown in FIG. 6C, for example.

Note that the difference ΔL in the optical path length difference between the measurement beam and the reference beam among the optical paths A to C is favorably larger than the distance resolution $\delta L_{FWHM}$ so that the peaks corresponding to the three spots (corresponding to the optical paths A to C) do not overlap each other and can be appropriately detected. Here, the distance resolution $\delta L_{FWHM}$ is obtained by the following expression: $\delta L_{FWHM}=c/n\delta f$ (c: speed of light, n: refractive index in optical path difference, $\delta f$: frequency sweep width). It may be possible to reduce the distance resolution $\delta L_{FWHM}$, reduce the half width of the peak waveform, and make the peaks appear more clearly by increasing the frequency sweep width $5f$.

When the surface of the measurement target T is a mirror surface, the measurement beam radiated toward the mirror surface, its reflected beam (first reflected beam), and the like are multiply reflected and become disturbance light, which is then included in the return beams received by the light-receiving unit 130. Then, there are cases where peaks caused by the multiple reflections appear in the signal waveform obtained through frequency conversion by means of FFT by the frequency analysis unit 141.

Figure 12:
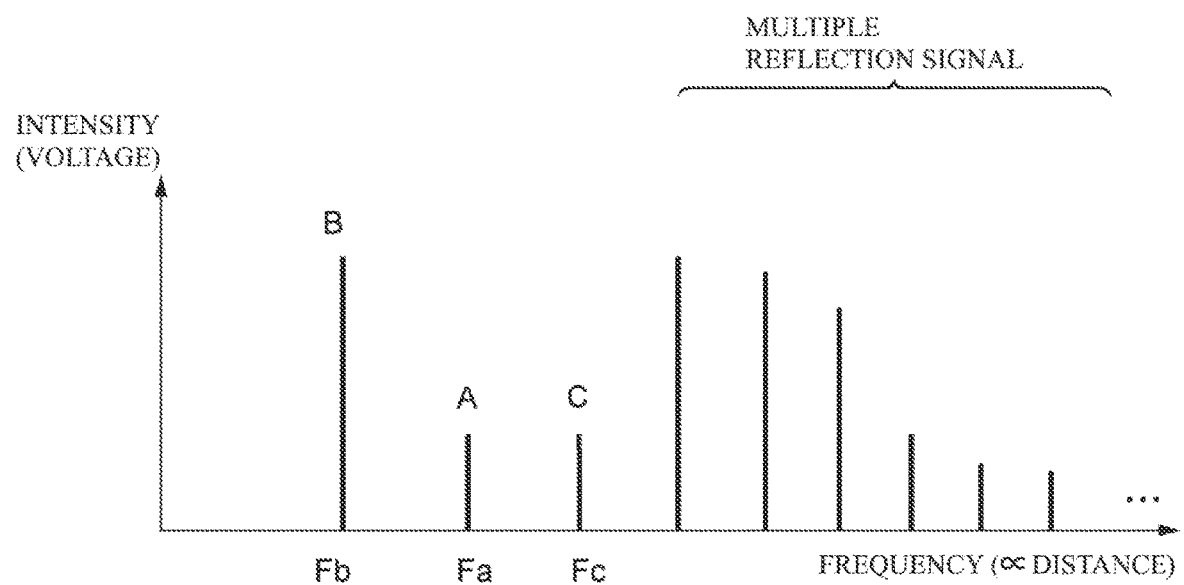
FIG. 12 a schematic diagram illustrating an example of a signal waveform of return beams received by a light-receiving unit after being subjected to frequency conversion by means of a Fast Fourier Transform (FFT) when a surface of a measurement target is a mirror surface.

FIG. 12 schematically shows an example of a signal waveform of return beams received by the light-receiving unit 130 after being subjected to frequency conversion by means of FFT when the surface of the measurement target T is a mirror surface. As shown in FIG. 12, the peak based on the spot corresponding to the optical path B appears to be large since the measurement target T has a mirror surface. However, peaks based on the spots corresponding to the other optical paths appear to be small. Moreover, a plurality of peaks caused by the effect of multiple reflection signals also appear. The optical path B is one of the optical paths A to C that corresponds to the spot for which the optical path length difference between the optical path of the measurement beam and the first reflected beam and the optical path of the reference beam and the second reference beam is shortest, and is arranged on the optical axis of the objective lens 124. Even when the measurement target T has a mirror surface, multiple reflection signals occur due to a directly reflected light beam being guided at an unexpected position or in an unexpected direction and further reflected and received by the light-receiving unit 130, and appear on the higher frequency side with respect to the signals corresponding to the respective spots.

Here, the peaks based on the spots corresponding to the optical paths A and C appear so that they can be distinguished from the plurality of peaks caused by the effect of the multiple reflection signals. In practice, however, the plurality of peaks caused by the effect of the multiple reflection signals cannot be predicted in terms of how they appear, and there are cases where these peaks are mixed in and cancel the peaks based on the spots corresponding to the optical paths A and C.

The mode determination unit 142 in the processor 140 determines whether to apply a mirror surface mode or a rough surface mode to measure the measurement target T in accordance with whether the surface of the measurement target T to be measured is a mirror surface or a rough surface.

If the mode determination unit 142 determines to apply the rough surface mode, the distance calculation unit 143 calculates the distance to the measurement target T based on the peaks corresponding to the three detected spots (corresponding to the optical paths A to C), as described with reference to FIG. 11.

On the other hand, if the mode determination unit 142 determines to apply the mirror surface mode, the distance calculation unit 143 calculates the distance to the measurement target T based on the peak corresponding to the spot corresponding to the optical path B in which the optical path length difference is shortest, since peaks caused by multiple reflections are present in addition to the peaks corresponding to the three respective spots (corresponding to the optical paths A to C), as described with reference to FIG. 12. Specifically, in the optical path B, the leading end position of the optical fiber cable is arranged closest to the measurement target T so that the optical path length difference between the measurement beam and the reference beam is shortest among the optical paths A to C, and is also arranged on the optical axis of the objective lens 124. In other words, the peak corresponding to the spot corresponding to the optical path B is set so as to be reliably and appropriately detected as the lowest-frequency peak. As a result, the distance value corresponding to the frequency Fb corresponding to the peak may be used as the distance to the measurement target T.

Method for Calculating Distance to Measurement Target in Accordance with Mode

Next, a method for calculating the distance to the measurement target T in accordance with a mode will be described in detail.

Figure 13A:
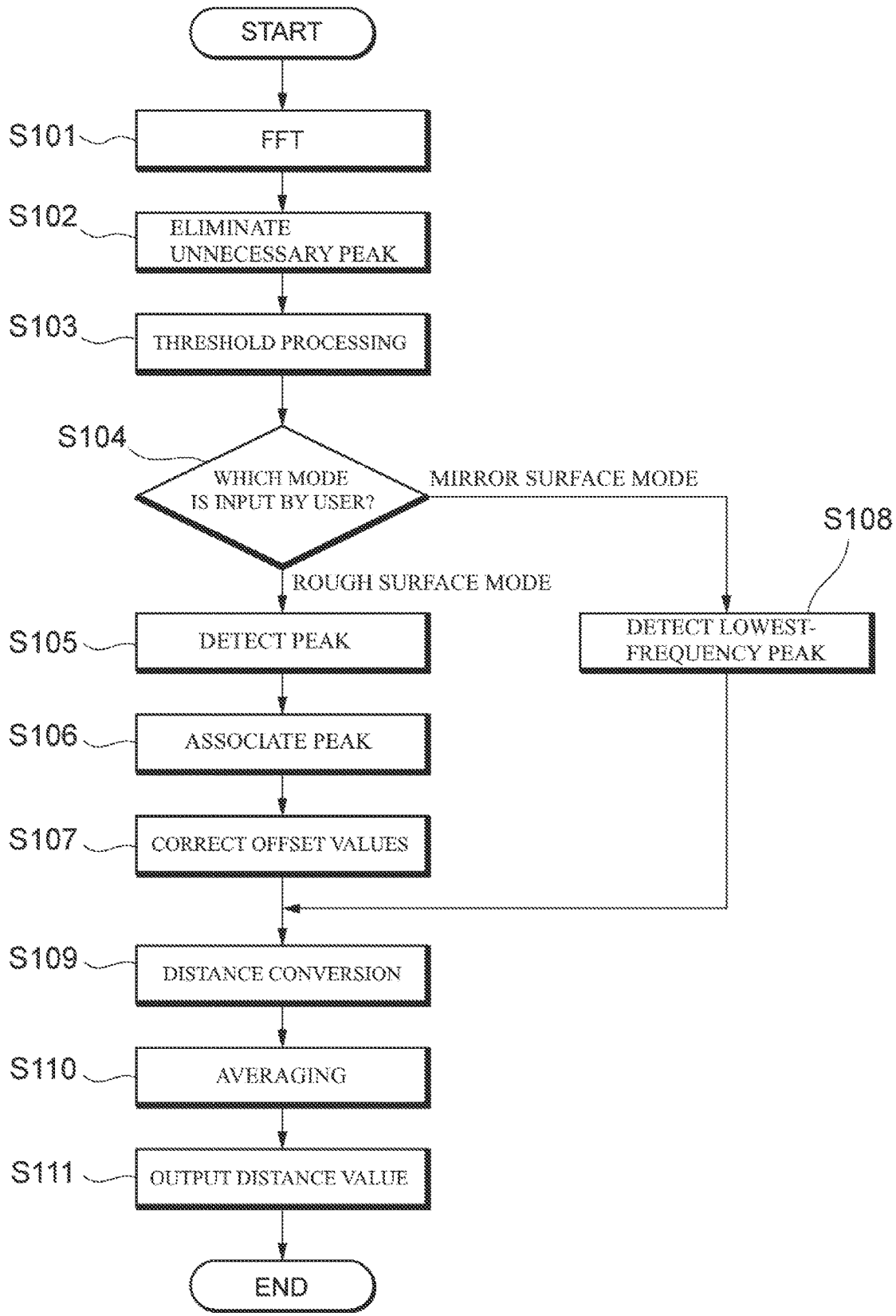
FIG. 13A is a flowchart illustrating a method for calculating a distance to a measurement target that is executed by a processor, such as a processor 140 as disclosed herein.

FIG. 13A is a flowchart illustrating a method for calculating the distance to the measurement target T that is executed by the processor 140. The illustrated method includes steps S101 to S111, as shown in FIG. 13.

In step S101, the frequency analysis unit 141 in the processor 140 performs frequency conversion on a waveform signal from the light-receiving unit 130 by means of FFT, as in step S31 shown in FIG. 8, for example.

In step S102, the processor 140 deletes unnecessary peaks from the signal waveform after being subjected to frequency conversion in step S101. For example, the processor 140 deletes unnecessary peaks that appear on the low-frequency side (proximal side) due to the effect of lens reflections or the like.

In step S103, the processor 140 performs peak determination on the signal waveform after being subjected to frequency conversion in step S101, by means of threshold processing. For example, the processor 140 ascertains the noise level of the signal waveform after being subjected to frequency conversion in step S101, and thereafter detects portions of the signal with a signal intensity that are not smaller than a predetermined threshold Th1 as peaks.

Note that, here, the threshold Th1 may be preset, or may vary dynamically. For example, an SNR may be calculated for each peak after estimating the noise between the peaks, and peaks with signal intensities exceeding the predetermined threshold Th1 (e.g., SNR>9) may be detected.

In step S104, the mode determination unit 142 in the processor 140 determines whether to apply the mirror surface mode or the rough surface mode based on the user's selection. The mirror surface mode or the rough surface mode can be selected by the user. For example, the user may operate the setting unit 32 in the controller 30 to select the mirror surface mode or the rough surface mode in advance. Alternatively, the mirror surface mode or the rough surface mode may be selected as a result of the material or the like of the measurement target T being input by the user or automatically determined.

If, in step S104, the mode determination unit 142 determines to apply the rough surface mode, the processing advances to step S105. If the mode determination unit 142 determines to apply the mirror surface mode, the processing advances to step S108.

In step S105, the processor 140 detects three peaks appearing in the signal waveform after being subjected to frequency conversion by means of FFT, as described with reference to FIG. 11.

In step S106, the processor 140 determines which of the optical paths A to C each of the three peaks detected in step S105 corresponds to. As mentioned above, the optical path length difference between the measurement beam and the reference beam is made different among the three spots (corresponding to the optical paths A to C. The above described configuration makes it possible to determine which of the optical paths A to C each of the detected peaks corresponds to.

In step S107, the processor 140 corrects the distance values corresponding to the frequencies Fa to Fc in accordance with the respective shift amounts, since the leading end positions of the optical fiber cables arranged in the optical paths A to C are shifted with respect to each other in the optical axis direction.

On the other hand, in step S108, the processor 140 detects the lowest-frequency peak out of the peaks appearing in the signal waveform after being subjected to frequency conversion by means of FFT, as described with reference to FIG. 12. As mentioned above, the lowest-frequency peak is based on the spot corresponding to the optical path B, in which the leading end position of the optical fiber cable is arranged closest to the measurement target T so that the optical path length difference between the measurement beam and the reference beam is shortest among the optical paths A to C, and is also arranged on the optical axis of the objective lens 124.

In step S109, the distance calculation unit 143 in the processor 140 converts frequency into distance as in step S32 shown in FIG. 8, for example.

In step S110, in the rough surface mode, the distance calculation unit 143 obtains a distance value by averaging the three distance values that are corrected in accordance with the shift amounts of the leading end positions of the optical fiber cables in step S107. In the mirror surface mode, the distance calculation unit 143 obtains a distance value that is calculated from the peak based on the spot corresponding to the optical path B that is detected in step S108.

In step S111, the distance calculation unit 143 outputs the distance value obtained in step S110 as the result of measuring the distance to the measurement target T.

Thus, the processor 140 calculates the distance to the measurement target T in accordance with the mirror surface mode or the rough surface mode that is selected by the user. Even if the measurement target T includes a rough surface and a mirror surface, the processor 140 appropriately calculates the distance to the measurement target T.

Note that whether to apply the mirror surface mode or the rough surface mode may alternatively be determined automatically depending on the number of peaks detected in the signal waveform after being subjected to frequency conversion in step S101, rather than being selected by the user.

Figure 13B:
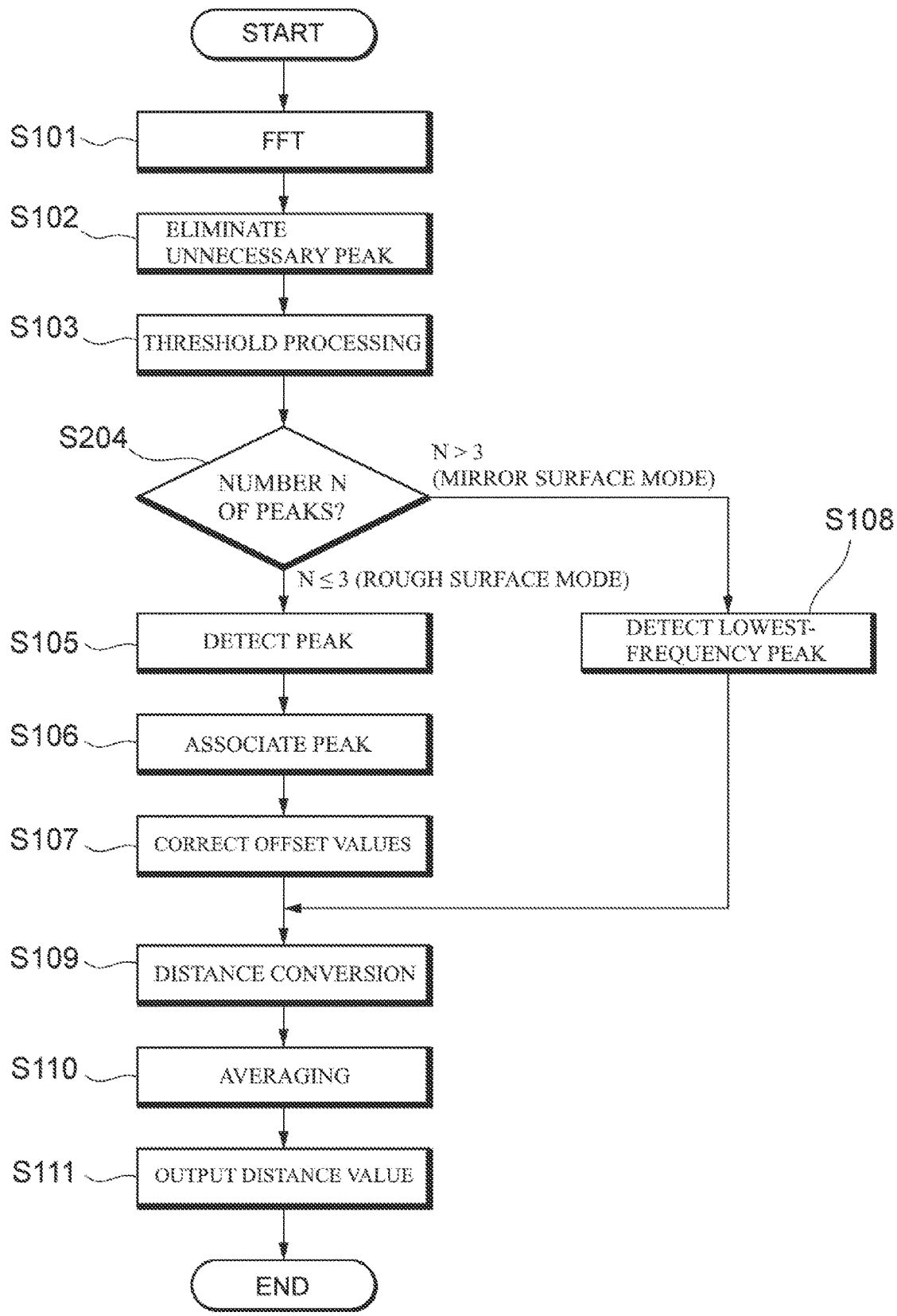
FIG. 13B is a flowchart illustrating a method for automatically determining whether to apply a mirror surface mode or a rough surface mode and calculating a distance to a measurement target that is executed by a processor.

FIG. 13B is a flowchart illustrating a method for automatically determining whether to apply the mirror surface mode or the rough surface mode and calculating the distance to the measurement target T that is executed by the processor 140. As shown in FIG. 13B, the illustrated method differs in step S204 from the method shown in FIG. 13A, but the other steps may be the same.

In step S204, the processor 104 determines the number N of portions of the signal that have signal intensities that are not smaller than the predetermined threshold Th1 and detected as peaks in step S103. Specifically, ordinarily, three peaks based on the spots corresponding to the optical paths A to C are detected with the multiple heads (here, the number of multiple heads is three), as shown in FIG. 11. Therefore, in such a case, the mode determination unit 142 in the processor 140 determines to apply the rough surface mode.

There are also cases where peaks disappear due to, for example, noise deriving from the surface shape of the measurement target T, the surrounding environment, or the like. Considering such cases, the mode determination unit 142 in the processor 140 determines to apply the rough surface mode if the number of detected peaks is three or less. In other words, the mode determination unit 142 in the processor 140 may determine to apply the rough surface mode if the number of detected peaks is not more than the number of multiple heads.

If some peaks have disappeared, e.g., if the number of detected peaks is zero, it may be determined that the distance to the measurement target T cannot be calculated and an error has occurred, or the previously calculated distance value may be output. Similarly, it may also be determined that some peaks have disappeared and an error has occurred if the number of detected peaks is 1 or 2 (if the number of detected peaks is not equal to the number of multiple heads).

On the other hand, if a plurality of peaks appear due to the effect of multiple reflection signals and the number of detected peaks is more than three as shown in FIG. 12, the mode determination unit 142 in the processor 140 determines to apply the mirror surface mode. In other words, if the number N of detected peaks is larger than the number of multiple heads, it is estimated that the measurement target T has a mirror surface, and the measurement beam radiated toward the mirror surface, its reflected beam (first reflected beam), or the like are multiply reflected. Therefore, the mode determination unit 142 in the processor 140 may determine to apply the mirror surface mode.

Thus, even if the user does not select the mirror surface mode or the rough surface mode, it is automatically determined whether to apply the mirror surface mode or the rough surface mode in accordance with the number of peaks detected in the signal waveform after being subjected to frequency conversion in step S101. The distance to the measurement target T is appropriately measured even if the measurement target T includes a rough surface or a mirror surface.

Note that in FIGS. 13A and 13B, the processor 140 converts frequency to distance in step S109, which is immediately after step S107 or S108, and processes distance values such as averaging in the subsequent steps. However, the distance conversion in step S109 need not by performed immediately after step S107 or S108. For example, the processor 140 may convert frequency to distance immediately after step S101, or at any other timing, as in the case of distance conversion (step S32) shown in FIG. 8.

As described above, In the optical interference range sensor 100 according to one or more embodiments, the interferometer 120 radiates light beams that are split in correspondence with three spots toward a measurement target T, generates interference beams by interference between measurement beams radiated toward the measurement target T and reflected at the measurement target T and reference beams passing through optical paths that are at least partially different from those of the measurement beams, and outputs the generated interference beams as return beams. The light-receiving unit 130 receives the return beams from the interferometer 120. The processor 140 detects peaks of the return beams, and calculates the distance to the measurement target T by associating the detected peaks with the spots in accordance with one of the mirror surface mode and the rough surface mode, which are modes for measuring the measurement target T. Here, the optical path length difference between the measurement beam and the reference beam is made different among the light beams that are split in correspondence with the three spots. Accordingly, the peaks can be appropriately detected. Furthermore, in the mirror surface mode, the distance calculated based on the peak corresponding to the spot (optical path B) with which the optical path length difference is shortest, out of the detected peaks, is used as the result of measuring the measurement target T. In other words, the distance to the measurement target T can be appropriately measured even if the measurement target T includes a rough surface and a mirror surface.

Also, the user does not need to use different sensor heads for the mirror surface and the rough surface and is able to appropriately measure the distance to the measurement target T with one sensor head. Even if the measurement target T includes a mirror surface, the problem that it is not possible to accurately measure the distance due to multiple reflections becoming disturbance light can be avoided.

Note that the splitting unit 121 in the present embodiment is configured to split a light beam from the wavelength-swept light source 110 into beams with three optical paths A to C and radiate measurement beams toward three spots on the measurement target T. However, there is no limitation thereto. For example, the number of optical paths split and the number of spots may be two, or may be four or more.

Variations of Collimating Lens and Objective Lens

In the above embodiment, the optical interference range sensor 100 has one objective lens 124 for a plurality of (e.g., three) collimating lenses. However, the configuration of the collimating lenses and the objective lens is not limited thereto.

Figure 14A:
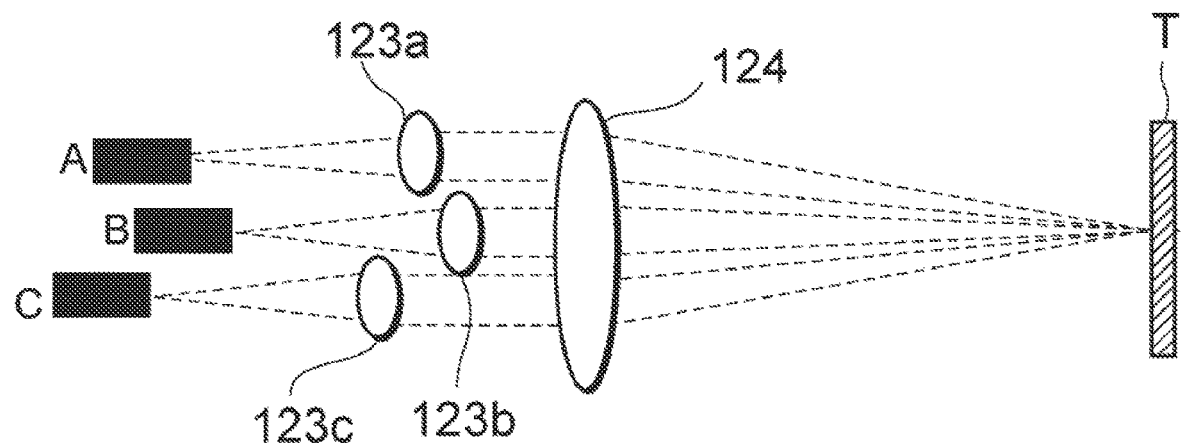
FIGS. 14A, 14B and 14C are diagrams illustrating variations of an arrangement of various objective lenses with respect to a plurality of collimating lenses.
Figure 14B:
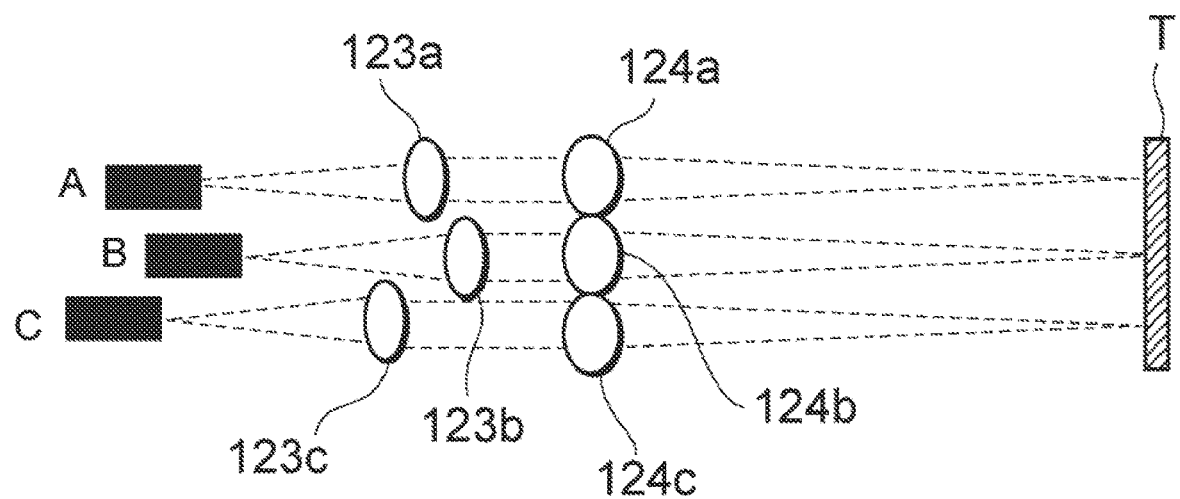
Figure 14C:
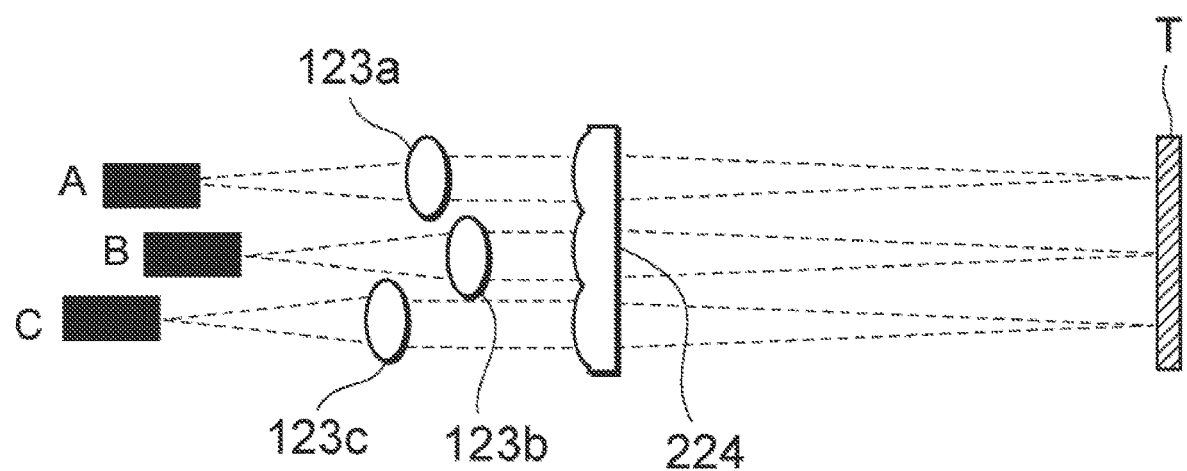

FIGS. 14A to 14C show variations of the arrangement of various objective lenses for a plurality of collimating lenses. In FIG. 14A, the collimating lenses 123a to 123c are arranged for the respective optical paths formed by three optical fiber cables A to C, and one objective lens 124 is arranged. Such a configuration of the sensor head in the optical interference range sensor 100 according to the above embodiment, may reduce the spot diameter. The distance to the measurement target T can be appropriately measured with high accuracy even if the measurement target T is small. In addition, the number of objective lenses 124 is one, facilitating the adjustment of the optical axis and leading to cost reduction. Furthermore, the sensor head size can be reduced.

In FIG. 14B, the collimating lenses 123a to 123c and objective lenses 124a to 124c are arranged in the respective optical paths formed by the three optical fiber cables A to C. Such a configuration requires the adjustment of the optical axes and increases the spot diameter. However, the arrangement for the optical paths is more flexible. In addition, the sensor head size can be reduced.

In FIG. 14C, the collimating lenses 123a to 123c are arranged for the respective optical paths formed by the three optical fiber cables A to C, and one objective lens 224 is arranged. Such a configuration requires one objective lens 224 and therefore facilitates the adjustment of the optical axes and leads to cost reduction, compared to the configuration shown in FIG. 14B.

Figure 15A:
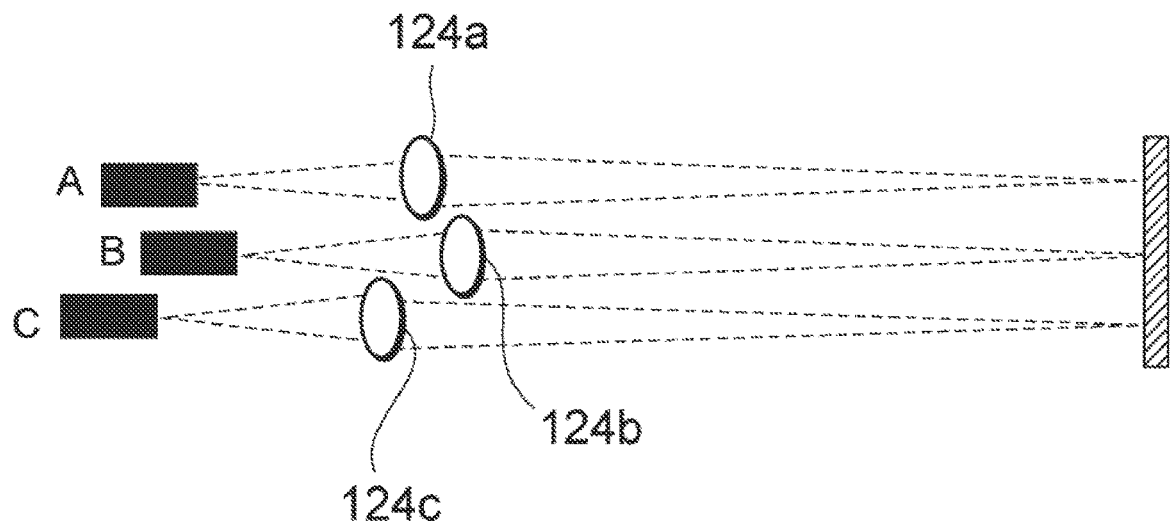
FIGS. 15A and 15B are diagrams illustrating variations of an arrangement of a plurality of objective lenses with no collimating lens arranged.
Figure 15B:
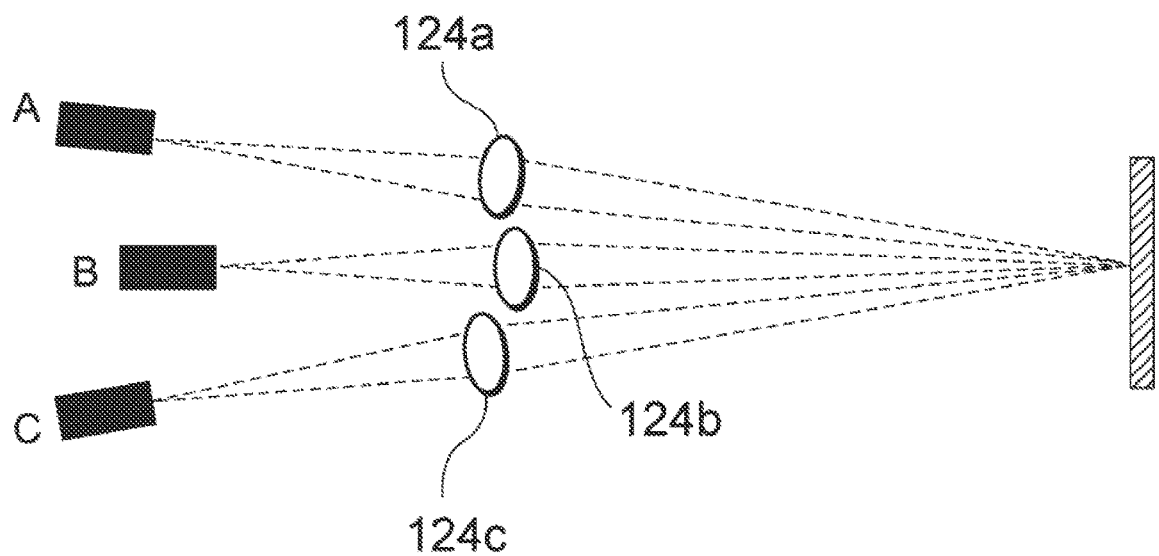

FIGS. 15A and 15B show variations of the arrangement of a plurality of objective lenses with no collimating lens arranged. In FIG. 15A, the objective lenses 124a to 124c are arranged for the respective optical paths formed by the three optical fiber cables A to C. Such a configuration increases the spot diameter. However, not arranging collimating lenses facilitates the adjustment of the optical axes and leads to cost reduction. In addition, the sensor head size can be reduced.

In FIG. 15B, the objective lenses 124a to 124c are arranged for the respective optical paths formed by the three optical fiber cables A to C. Here, the position and the angle of the optical paths formed by the three optical fiber cables A to C and the objective lenses 124a to 124c are adjusted so as to reduce the spot diameter. Such a configuration reduces the spot diameter, and enables the distance to the measurement target T to be appropriately measured with high accuracy even if the measurement target T is small. Furthermore, not arranging collimating lenses leads to cost reduction.

Figure 16:
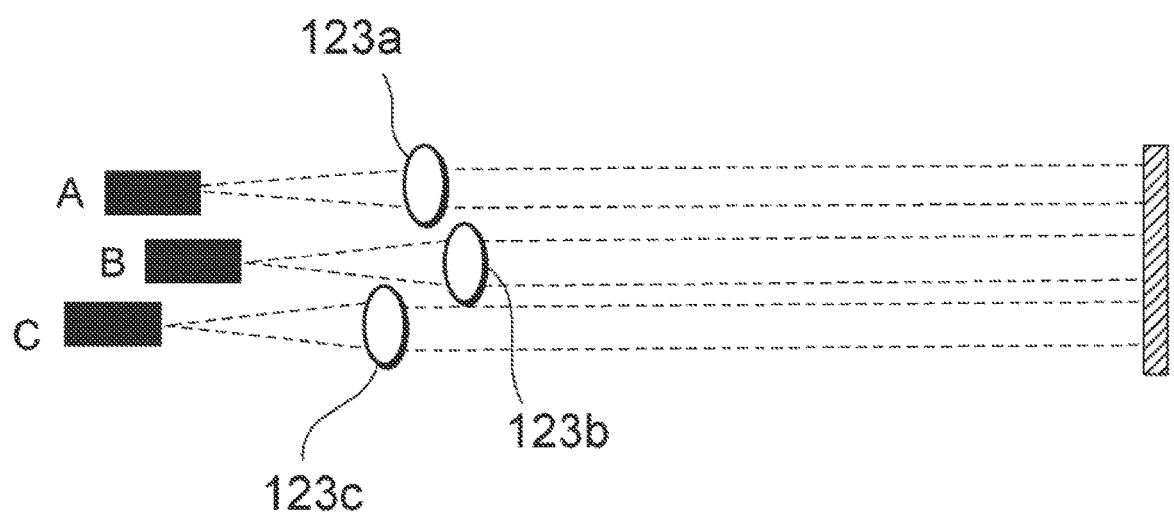
FIG. 16 is a diagram illustrating a variation of an arrangement of a plurality of collimating lenses with no objective lens arranged.

FIG. 16 shows a variation of the arrangement of a plurality of collimating lenses with no objective lens arranged. In FIG. 16, the collimating lenses 123a to 123c are arranged for the respective optical paths formed by the three optical fiber cables. Such a configuration increases the spot diameter. However, not arranging objective lens facilitates the adjustment of the optical axes and leads to cost reduction. In addition, the sensor head size can be reduced.

Thus, various sensor heads are available depending on the configuration of the collimating lenses and objective lenses. Any appropriate sensor head may be used in accordance with the size, shape, and material of the measurement target T, the required measurement accuracy, or the like.

Variation of Interferometer

The optical interference range sensor 100 in the above embodiment uses a Fizeau interferometer that generates an interference beam by using the leading end (end face) of the optical fiber cable in each of the optical paths A to C split by the splitting unit 121 as a reference surface (reference beam and reflected beam thereof). However, the interferometer is not limited thereto.

Figure 17A:
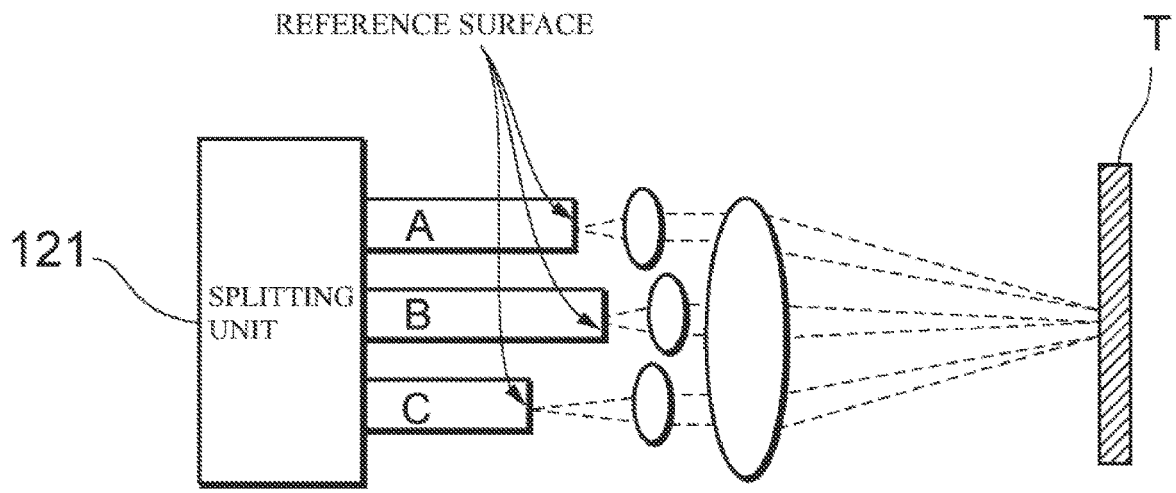
FIGS. 17A, 17B and 17C are diagrams illustrating variations of interferometers that generate interference beams using a measurement beam and a reference beam.
Figure 17B:
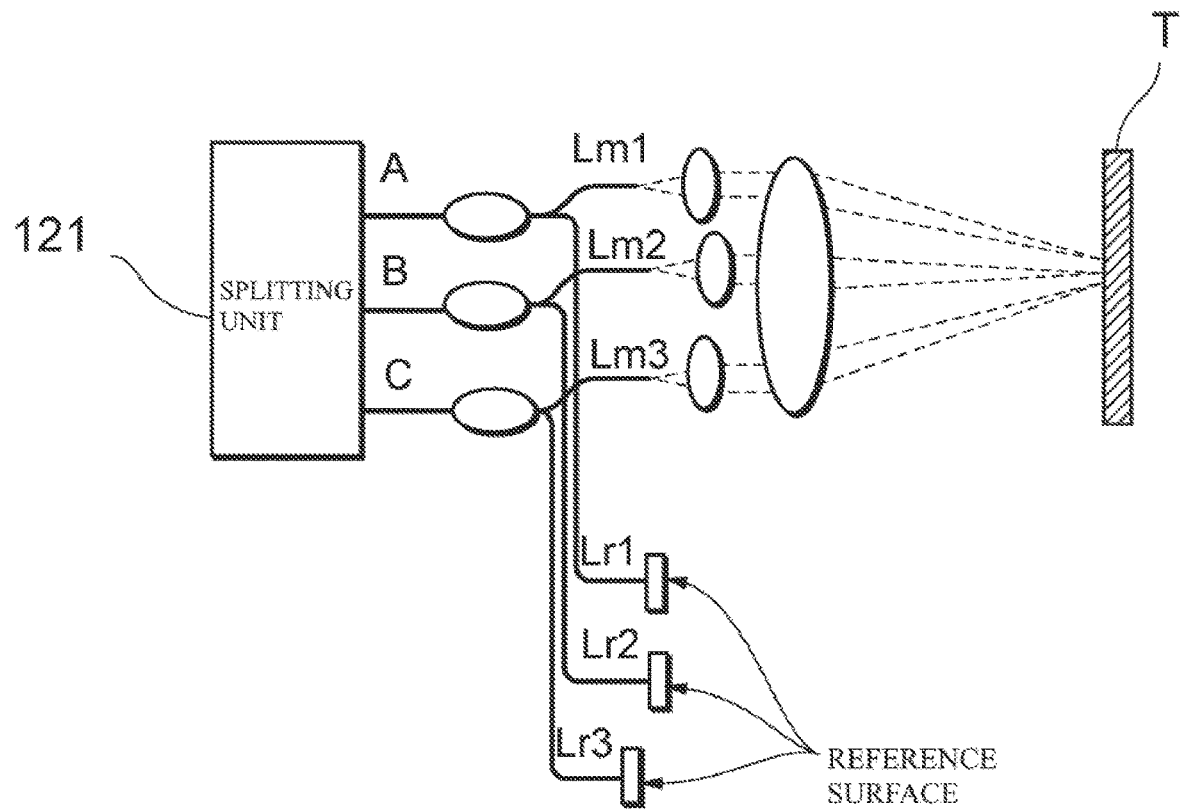
Figure 17C:
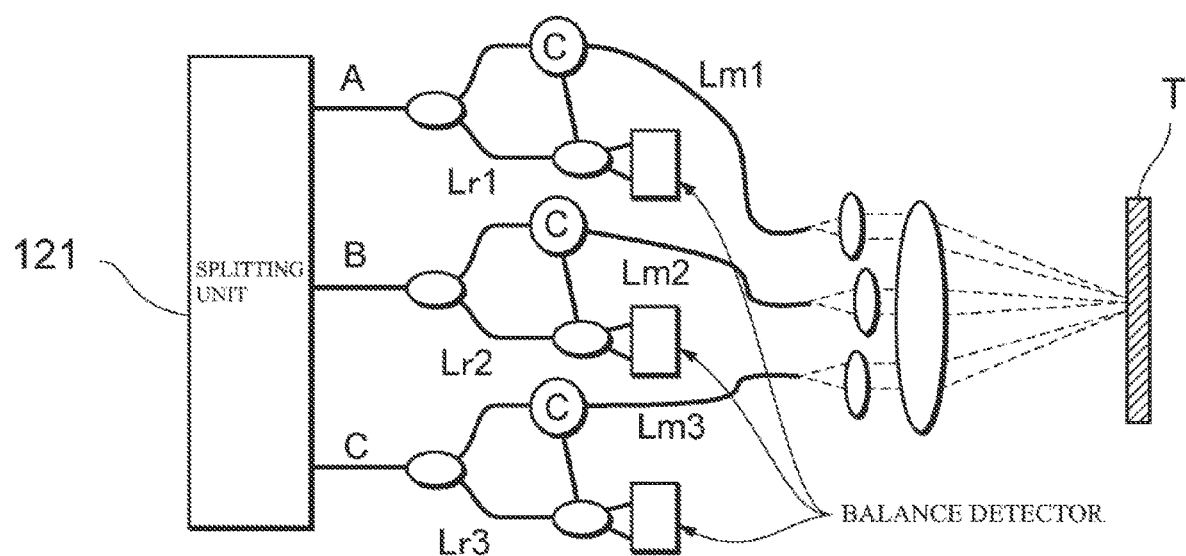

FIGS. 17A to 17C show variations of interferometers that generate an interference beam using a measurement beam and a reference beam. In FIG. 17A, the leading end positions of the optical fiber cables are shifted in the optical axis direction so that the optical path length difference is different among the optical paths A to C split by the splitting unit 121, while using the leading end (end face) of each optical fiber cable as a reference surface. Such is a configuration of the interferometer 120 (Fizeau interferometer) of the optical interference range sensor 100 according to the above described embodiment or embodiments. The reference surface may alternatively be configured so that a light beam is reflected due to a difference in refractive index between the optical fiber cable and the air (Fresnel reflection). In addition, the leading end of each optical fiber may also be coated with a reflective film. Alternatively, a configuration may also be employed in which a non-reflective coating is applied to the leading end of each optical fiber, and a reflective surface, such as a lens surface, is arranged separately.

In FIG. 17B, measurement optical paths Lm1 to Lm3 for guiding measurement beams to the measurement target T and reference optical paths Lr1 to Lr3 for guiding reference beams are formed in the optical paths A to C split by the splitting unit 121. Reference surfaces are arranged at leading ends of the reference optical paths Lr1 to Lr3 (Michelson interferometer). The reference surfaces may be obtained by coating the leading ends of the optical fiber cables with reflective films, or may be obtained by applying non-reflective coating to the leading ends of the optical fibers and separately arranging reflective surfaces such as lens surfaces. In such a configuration, the measurement optical paths Lm1 to Lm3 have the same optical path length, while the optical path length difference is provided between the reference optical paths Lr1 to Lr3, thereby making the optical path length difference different among the optical paths A to C. Optical design in the sensor head can be simplified since the optical path lengths of the measurement optical paths Lm1 to Lm3 can be made identical.

In FIG. 17C, measurement optical paths Lm1 to Lm3 for guiding measurement beams to the measurement target T and reference optical paths Lr1 to Lr3 for guiding reference beams are formed in the optical paths A to C split by the splitting unit 121. Balance detectors are arranged in the reference optical paths Lr1 to Lr3 (Mach-Zehnder interferometer). In such a configuration, the measurement optical paths Lm1 to Lm3 have the same optical path length, while the optical path length difference is provided between the reference optical paths Lr1 to Lr3, thereby making the optical path length difference different among the optical paths A to C. Optical design in the sensor head can be simplified since the optical path lengths of the measurement optical paths Lm1 to Lm3 can be made identical.

Thus, the interferometer is not limited to the Fizeau interferometer in the above described embodiment or embodiments, and may be, for example, a Michelson interferometer or a Mach-Zehnder interferometer. Any type of interferometer may be applied, or a combination of those interferometers or any other configuration may be applied if an interference beam can be generated by setting the optical path length difference between a measurement beam and a reference beam.

The optical interference range sensor described in the present embodiment or embodiments may be used as a displacement sensor, a distance meter, a lidar, or the like for measuring the distance to the measurement target T.

The above-described embodiment or embodiments are for facilitating the understanding of the invention, and are not to be interpreted intended to be exhausting or as limiting the scope of the invention in any manner. The elements provided by the embodiments, and the arrangements, materials, conditions, shapes, sizes, and the like of these elements are not limited to those described as examples, and may be modified as appropriate. The configurations described in different embodiments can be partially replaced or combined.

Supplementary Notes

Embodiments may include an optical interference ranging sensor (100) including:
 a light source (111) configured to project a light beam while continuously varying a wavelength thereof;
 an interferometer (120) including a splitting unit (121) configured to split the light beam projected from the light source into light beams radiated toward a plurality of spots on a measurement target (T), the interferometer being configured to generate interference beams with the light beams split in correspondence with the plurality of spots, each of the interference beams being generated by interference between a measurement beam radiated toward the measurement target and reflected at the measurement target and a reference beam passing through an optical path that is at least partially different from an optical path of the measurement beam;
 a light-receiving unit (130) configured to receive the interference beams from the interferometer; and
 a processor (140) configured to detect a peak of the received interference beams, and calculate a distance to the measurement target by associating the detected peak with one of the plurality of spots in accordance with a mirror surface mode or a rough surface mode, which are modes for measuring the measurement target,
 wherein an optical path length difference between the measurement beam and the reference beam is made different among the light beams split in correspondence with the plurality of spots, and
 in the mirror surface mode, the processor uses, as the result of measuring the distance to the measurement target, a distance calculated based on a peak corresponding to a spot for which the optical path length difference is shortest, out of a plurality of the detected peaks.

LIST OF REFERENCE NUMERALS

1 Sensor system
10 Displacement sensor
11 Control device
12 Control signal input sensor
13 Externally connected device
20 Sensor head
21 Objective lens
22, 22a to 22c Collimating lens
23 Objective lens holder
24, 24a to 24c Collimating lens unit
30 Controller
31 Display unit
32 Setting unit
33 External interface (I/F) unit
34 Optical fiber cable connector
35 External storage unit
36 Measurement processor
40 Optical fiber cable
51 Wavelength-swept light source
52 Optical amplifier
53, 53a to 53b Isolator
54, 54a to 54j Optical coupler
55 Attenuator
56a to 56c Light-receiving element
57 Multiplexer circuit
58 AD conversion unit
59 Processor
60 Balance detector
61 Correction signal generation unit
71a to 71e Light-receiving element
72a to 72c Amplifier circuit
73 Multiplexer circuit
74 AD conversion unit
75 Processor
76 Differential amplifier circuit
77 Correction signal generation unit
100 Optical interference range sensor
110 Wavelength-swept light source
120 Interferometer
121 Splitting unit
122 Sensor head
123a to 123c Collimating lens
124, 124a to 124c, 224 Objective lens
130 Light-receiving unit
131 Light-receiving element
132 AD conversion unit
140 Processor
141 Frequency analysis unit
142 Mode determination unit
143 Distance calculation unit T Measurement target
Lm1 to Lm3 Measurement optical path
Lr1 to Lr3 Reference optical path

The invention claimed is:

1. An optical interference ranging sensor comprising:
a light source configured to project a light beam while continuously varying a wavelength thereof;
an interferometer comprising a splitting unit including a coupler configured to split the light beam projected from the light source into light beams radiated toward a plurality of spots on a measurement target, the interferometer being configured to generate interference beams with the light beams split in correspondence with the plurality of spots, each of the interference beams being generated by interference between a measurement beam radiated toward the measurement target and reflected at the measurement target and a reference beam passing through an optical path that is at least partially different from an optical path of the measurement beam;
a light-receiving unit comprising a photodetector configured to receive the interference beams from the interferometer; and
a processor configured to perform operations comprising detecting a peak of the received interference beams, and calculating a distance to the measurement target by associating the detected peak with one of the plurality of spots in accordance with a mirror surface mode or a rough surface mode, which are modes for measuring the measurement target, wherein
an optical path length difference between the measurement beam and the reference beam is made different among the light beams split in correspondence with the plurality of spots, and
in the mirror surface mode, the processor uses, as a result of measuring the distance to the measurement target, a distance calculated based on a peak corresponding to a spot for which the optical path length difference is shortest, out of a plurality of the detected peaks.

2. The optical interference ranging sensor according to claim 1,
wherein in the rough surface mode, the processor uses a distance calculated based on the plurality of detected peaks as the result of measuring the distance.

3. The optical interference ranging sensor according to claim 2,
wherein the interferometer has one objective lens, and
the measurement beam of each of the light beams split in correspondence with the plurality of spots by the splitting unit is radiated toward the measurement target via the one objective lens.

4. The optical interference ranging sensor according to claim 2,
wherein the interferometer generates each of the interference beams by interference between a first reflected beam that is a reflected beam of the measurement beam radiated toward the measurement target and reflected at the measurement target and a second reflected beam that is a reflected beam of the reference beam reflected at a reference surface.

5. The optical interference ranging sensor according to claim 2,
wherein a difference $\Delta L$ in the optical path length difference among the light beams split in correspondence with the plurality of spots is at least larger than a distance resolution $\delta L_{FWHM}$, which is represented by:

$$\delta L_{FWHM} = c/n\delta f$$

(where c: speed of light, n: refractive index in optical path difference, δf: frequency sweep width).

6. The optical interference ranging sensor according to claim 2,
wherein one of the mirror surface mode and the rough surface mode is selectable by a user.

7. The optical interference ranging sensor according to claim 1,
wherein the interferometer has one objective lens, and
the measurement beam of each of the light beams split in correspondence with the plurality of spots by the splitting unit is radiated toward the measurement target via the one objective lens.

8. The optical interference ranging sensor according to claim 7,
wherein a spot for which the optical path length difference is shortest, out of the optical path length differences corresponding to the respective spots, is arranged on an optical axis of the one objective lens.

9. The optical interference ranging sensor according to claim 8,
wherein the interferometer generates each of the interference beams by interference between a first reflected beam that is a reflected beam of the measurement beam radiated toward the measurement target and reflected at the measurement target and a second reflected beam that is a reflected beam of the reference beam reflected at a reference surface.

10. The optical interference ranging sensor according to claim 8,
wherein a difference $\Delta L$ in the optical path length difference among the light beams split in correspondence with the plurality of spots is at least larger than a distance resolution $\delta L_{FWHM}$, which is represented by:

$$\delta L_{FWHM} = c/n\delta f$$

(where c: speed of light, n: refractive index in optical path difference, δf: frequency sweep width).

11. The optical interference ranging sensor according to claim 7,
wherein the interferometer generates each of the interference beams by interference between a first reflected beam that is a reflected beam of the measurement beam radiated toward the measurement target and reflected at the measurement target and a second reflected beam that is a reflected beam of the reference beam reflected at a reference surface.

12. The optical interference ranging sensor according to claim 7,
wherein a difference $\Delta L$ in the optical path length difference among the light beams split in correspondence with the plurality of spots is at least larger than a distance resolution $\delta L_{FWHM}$, which is represented by:

$$\delta L_{FWHM} = c/n\delta f$$

(where c: speed of light, n: refractive index in optical path difference, δf: frequency sweep width).

13. The optical interference ranging sensor according to claim 7,
wherein one of the mirror surface mode and the rough surface mode is selectable by a user.

14. The optical interference ranging sensor according to claim 1,
wherein the interferometer generates each of the interference beams by interference between a first reflected beam that is a reflected beam of the measurement beam radiated toward the measurement target and reflected at the measurement target and a second reflected beam that is a reflected beam of the reference beam reflected at a reference surface.

15. The optical interference ranging sensor according to claim 14,
wherein positions of leading ends of optical fiber cables for transmitting the respective light beams split in correspondence with the plurality of spots are shifted with respect to each other in an optical axis direction, each of the leading ends serving as the reference surface.

16. The optical interference ranging sensor according to claim 14,
wherein a difference $\Delta L$ in the optical path length difference among the light beams split in correspondence with the plurality of spots is at least larger than a distance resolution $\delta L_{FWHM}$, which is represented by:

$$\delta L_{FWHM}=c/n\delta f$$

(where c: speed of light, n: refractive index in optical path difference, δf: frequency sweep width).

17. The optical interference ranging sensor according to claim 15,
wherein a difference $\Delta L$ in the optical path length difference among the light beams split in correspondence with the plurality of spots is at least larger than a distance resolution $\delta L_{FWHM}$, which is represented by:

$$\delta L_{FWHM}=c/n\delta f$$

(where c: speed of light, n: refractive index in optical path difference, δf: frequency sweep width).

18. The optical interference ranging sensor according to claim 1,
wherein a difference $\Delta L$ in the optical path length difference among the light beams split in correspondence with the plurality of spots is at least larger than a distance resolution $\delta L_{FWHM}$, which is represented by:

$$\delta L_{FWHM}=c/n\delta f$$

(where c: speed of light, n: refractive index in optical path difference, δf: frequency sweep width).

19. The optical interference ranging sensor according to claim 1,
wherein one of the mirror surface mode and the rough surface mode is selectable by a user.

20. The optical interference ranging sensor according to claim 1,
wherein the processor applies the mirror surface mode if the number of detected peaks of the received interference beams is larger than the number of the plurality of spots.

* * * * *